United States Patent
Yang et al.

(10) Patent No.: US 11,910,262 B2
(45) Date of Patent: Feb. 20, 2024

(54) RADIO LINK MANAGEMENT FOR ULTRA-RELIABLE LOW-LATENCY COMMUNICATION

(71) Applicant: QUALCOMM Incorporated, San Diego, CA (US)

(72) Inventors: Wei Yang, San Diego, CA (US); Yi Huang, San Diego, CA (US); Wanshi Chen, San Diego, CA (US); Seyedkianoush Hosseini, San Diego, CA (US); Peter Gaal, San Diego, CA (US); Hwan Joon Kwon, San Diego, CA (US); Krishna Kiran Mukkavilli, San Diego, CA (US); Tingfang Ji, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/377,050

(22) Filed: Jul. 15, 2021

(65) Prior Publication Data

US 2022/0022120 A1    Jan. 20, 2022

Related U.S. Application Data

(60) Provisional application No. 63/054,200, filed on Jul. 20, 2020.

(51) Int. Cl.
*H04W 36/30* (2009.01)
*H04W 24/04* (2009.01)
(Continued)

(52) U.S. Cl.
CPC ......... *H04W 36/305* (2018.08); *H04L 5/0048* (2013.01); *H04W 24/04* (2013.01);
(Continued)

(58) Field of Classification Search
CPC .................. H04W 36/305; H04L 41/0668
See application file for complete search history.

(56) References Cited

U.S. PATENT DOCUMENTS

2018/0368126 A1 * 12/2018 Islam .................... H04L 5/1469
2019/0052377 A1 *  2/2019 Hwang ................. H04L 5/0035
(Continued)

FOREIGN PATENT DOCUMENTS

WO    WO-2019245352 A1 * 12/2019 ............ H04W 24/10
WO    WO-2021175744 A1 *  9/2021 .......... H04W 36/305

OTHER PUBLICATIONS

"3rd Generation Partnership Project, Technical Specification Group Radio Access Network, NR, Physical Layer Procedures for Control (Release 16)", 3GPP Draft, Draft 38213-G20, 3rd Generation Partnership Project (3GPP), Mobile Competence Centre, 650, Route Des Lucioles, F-06921 Sophia-Antipolis Cedex, France, Jul. 15, 2020 (Jul. 15, 2020), 3GPP TS 38.213 V16.2.0 (Jun. 2020), XP051908761, 176 Pages, Retrieved from the Internet: URL: https://ftp.3gpp.org/tsg_ran/WG1_RL1/DRAFT/Draft_versions/Draft38213-g20.zip, Draft38213-g20.docx, [retrieved on Jul. 15, 2020] p. 14, Line 24—p. 16, Line 13, Paragraph 7.1, Paragraph 7.7, Paragraph 7.7.1.

(Continued)

*Primary Examiner* — Yee F Lam
(74) *Attorney, Agent, or Firm* — Loza & Loza LLP

(57) ABSTRACT

Aspects relate to radio link management for a first type of link that is a high reliability, low-latency communication link such as ultra-reliable, low-latency communication (URLLC). Radio link failure (RLF) of the link may be determined in a wireless device that then transmits a link recovery request (LRR) communicating the RLF and a request for link recovery to a network in a reserved resource in an uplink channel using a second type of link that does not have as high priority (e.g., not as high reliability or as low-latency) as the first type of link, such as enhanced mobile broadband (eMBB). The wireless device receives a grant of uplink resources from the network responsive to the LRR, where the uplink resources are used by the wireless device to transmit an RLF report to the network and are also of the second type of link.

21 Claims, 14 Drawing Sheets

(51) Int. Cl.
  *H04W 24/08* (2009.01)
  *H04W 24/10* (2009.01)
  *H04W 72/21* (2023.01)
  *H04L 5/00* (2006.01)
(52) U.S. Cl.
  CPC .......... *H04W 24/08* (2013.01); *H04W 24/10* (2013.01); *H04W 72/21* (2023.01)

(56) References Cited

U.S. PATENT DOCUMENTS

| | | | |
|---|---|---|---|
| 2019/0182884 A1* | 6/2019 | Deenoo | H04W 16/28 |
| 2019/0229980 A1* | 7/2019 | Han | H04L 41/0668 |
| 2019/0306875 A1* | 10/2019 | Zhou | H04B 7/0695 |
| 2020/0260518 A1* | 8/2020 | Orsino | H04W 76/38 |
| 2020/0350972 A1* | 11/2020 | Yi | H04L 1/12 |
| 2021/0266811 A1* | 8/2021 | Hwang | H04W 28/06 |
| 2022/0095170 A1* | 3/2022 | Lindoff | H04W 24/08 |
| 2023/0086398 A1* | 3/2023 | Teyeb | H04W 76/19 |

OTHER PUBLICATIONS

Ericsson: "Latency Analysis of SCell Link Recovery Solutions", 3GPP TSG RAN WG1 Ad-Hoc Meeting 1901, 3GPP Draft, R1-1901202 Latency Analysis of SCell Link Recovery Solutions, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), 4 Pages, XP051594044, Retrieved from the Internet: URL : https://www.3gpp.org/ftp/TSG_RAN/WG1_RL1/TSGR1_AH/NR_AH_1901/Docs/R1-1901202.zip, [retrieved on Jan. 20, 2019], p. 2, line 20—p. 3, line 40.
International Search Report and Written Opinion—PCT/US2021/041972—ISA/EPO—dated Nov. 2, 2021.

* cited by examiner

RADIO LINK MANAGEMENT FOR ULTRA-RELIABLE LOW-LATENCY COMMUNICATION

CROSS REFERENCE TO RELATED APPLICATIONS

This application claims priority to and the benefit of U.S. Provisional Application No. 63/054,200 filed in the U.S. Patent and Trademark Office on Jul. 20, 2020, the entire contents of which are incorporated herein by reference as if fully set forth below in its entirety and for all applicable purposes.

TECHNICAL FIELD

The technology discussed below relates generally to wireless communication networks, and more particularly, to radio link management for ultra-reliable low-latency communication (URLLC) in wireless communication networks.

INTRODUCTION

In wireless communication systems, such as those specified under standards for 5G New Radio (NR), the use of ultra-reliable, low-latency communication (URLLC) imposes more stringent reliability and latency requirements for radio links than other communication modes, such as enhanced mobile broadband (eMBB) communication. In some cases, the reliability and latency of a radio link may be sufficient to support eMBB traffic, but may not be reliable or fast enough to support URLLC. In such a case, a user equipment (UE) in a cell may experience a URLLC radio link failure (RLF), while the radio link is still sufficient for eMBB communication. Additionally, radio link monitoring (RLM) procedures in 5G NR systems allow a UE to perform monitoring of RLF for eMBB, and to generate an associated RLF report that may be transmitted to the network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to radio link management for high reliability, low-latency radio link such as URLLC links. In an example, a method for wireless communication at a user equipment (UE) in a wireless communication network is disclosed. The method includes transmitting a link recovery request (LRR) in a reserved resource in a first uplink channel to a base station of a serving cell in response to sensing a radio link failure (RLF) of a first link of a first type of service having a higher priority than a second type of service that are both capable of being provided in the communication network. Further, the method includes receiving a grant of uplink (UL) resources from the base station in response to the transmitted LRR, and transmitting the RLF report in a second uplink channel based on the receiving the grant of UL resources from the base station.

In another example, a user equipment (UE) in a wireless communication network is disclosed, the UE including a wireless transceiver, a memory, and a processor communicatively coupled to the wireless transceiver and the memory. The processor and memory are configured to transmit a link recovery request (LRR) in a reserved resource in a first uplink channel to a base station of a serving cell in response to sensing a radio link failure (RLF) of a first link of a first type of service having a higher priority than a second type of service that are both capable of being provided in the communication network. The processor and memory are further configured to receive a grant of uplink (UL) resources from the base station in response to the transmitted LRR, and transmit the RLF report in a second uplink channel based on the receiving the grant of UL resources from the base station.

According to another example, a method for wireless communication at a user equipment (UE) in a wireless communication network is disclosed. The method includes transmitting a radio link failure (RLF) report to a base station on uplink resources on a first uplink data channel responsive to sensing an RLF of a first link of a first type of service having a higher priority than a second type of service that are both capable of being provided in the wireless communication network, and determining that the uplink resources are available for the UE for transmission of the RLF report. Additionally, the method includes receiving RLF recovery information from the base station in response to the RLF report.

In yet another example, a method for wireless communication at a base station in a wireless communication network is disclosed. The method includes receiving a link recovery request (LRR) from a user equipment (UE) in a reserved resource on a first uplink channel, wherein the LRR indicates a radio link failure of a first link of a first type of service having a higher priority than a second type of service that are both capable of being provided in the communication network. Moreover, the method includes sending a grant of uplink (UL) resources to the UE in response to the received LRR, wherein the grant for UL resources indicates an allocation of resources on a second uplink channel that is configured for transmission of an RLF report, and receiving the RLF report from the UE over the second uplink channel.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
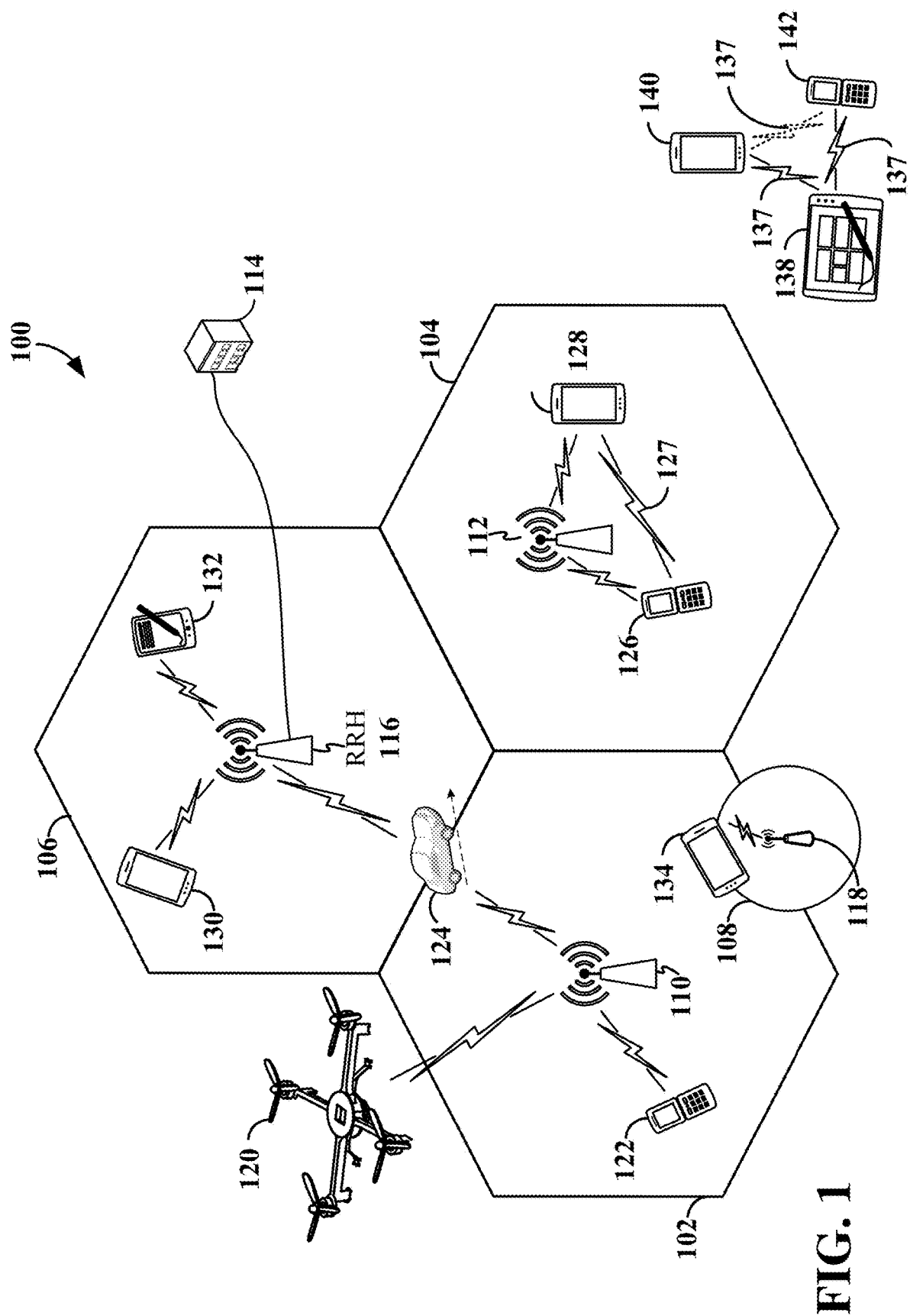
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Various aspects of the disclosure relate to technologies and techniques for radio link monitoring (RLM). RLM procedures specified in 3GPP's 5G NR Releases 15 and 16 allow a UE to perform radio link failure (RLF) detection and RLF reporting for eMBB, but no mechanisms have been previously specified for a UE to indicate RLF for URLLC when the link is nonetheless sufficient for eMBB communication. Accordingly, in certain aspects, the present disclosure provides for various radio link monitoring for URLLC to determine radio link failures for URLLC and to report the RLF to the network in order to effect radio link recovery to reestablish URLLC to a UE.

In some aspects, a UE may be configured to sense an RLF of a first link of a first type of service having a higher reliability and a lower latency (e.g., URLLC), where the first type of service has greater reliability and lower latency than a second type of service such as eMBB. The UE may be configured to generate an RLF report in response to the sensing of the RLF and also transmit a link recovery request (LRR) to a base station of a serving cell in response to sensing the RLF. In an aspect, the LRR is transmitted by the UE in a reserved resource in a first uplink channel (e.g., a physical uplink control channel (PUCCH)). The base station may, in turn, send a grant of uplink (UL) resources responsive to the LRR. The UE then may transmit the RLF report in a second uplink channel (e.g., a physical uplink shared channel (PUSCH)) using the granted UL resources on the second uplink channel.

In other aspects, rather than receiving a grant of UL resources, the UE may determine whether it has available uplink resources to be able to transmit the RLF report on an uplink data channel. If the resources are available, the UE then transmits the RLF report on the uplink data channel.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 sub-frames of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 2:
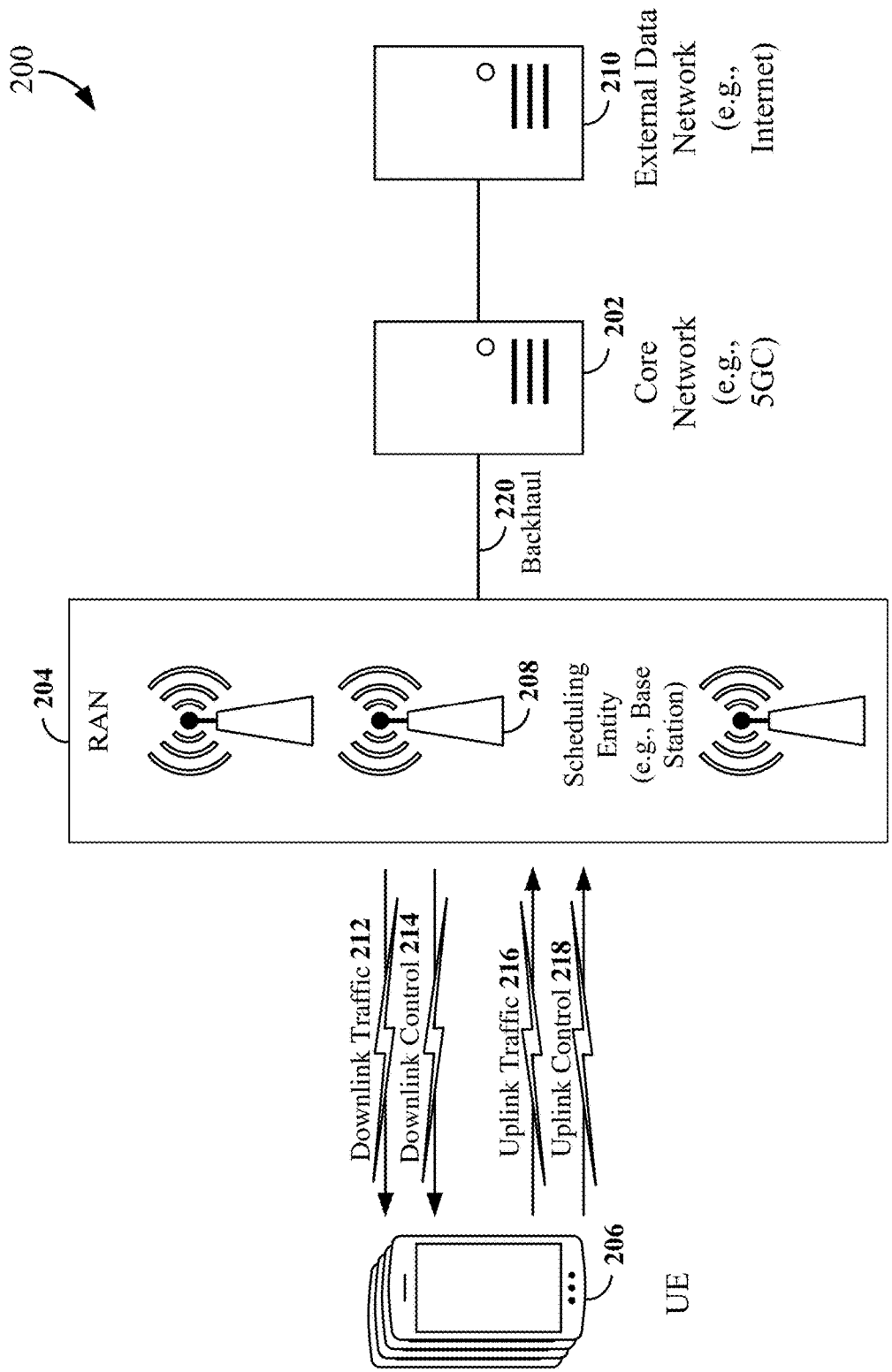
FIG. 2 is an illustration of a wireless communication system according to some aspects.

FIG. 2, as another illustrative example without limitation, illustrates various aspects with reference to a schematic of a wireless communication system 200. The wireless communication system 200 includes three interacting domains: a core network 202, a radio access network (RAN) 204, and a user equipment (UE) 206. By virtue of the wireless communication system 200, the UE 206 may be enabled to carry out data communication with an external data network 210, such as (but not limited to) the Internet.

The RAN 204 may implement any suitable wireless communication technology or technologies to provide radio access to the UE 206. As one example, the RAN 204 may operate according to 3rd Generation Partnership Project (3GPP) New Radio (NR) specifications. As another example, the RAN 204 may operate under a hybrid of 5G NR and Evolved Universal Terrestrial Radio Access Network (eUTRAN) standards, often referred to as LTE, such as in non-standalone (NSA) systems including EN-DC systems. The 3GPP also refers to this hybrid RAN as a next-generation RAN, or NG-RAN. Additionally, many other examples may be utilized within the scope of the present disclosure.

As illustrated in FIG. 2, the RAN 204 includes a plurality of base stations 208. In different technologies, standards, or contexts, the base stations 208 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The RAN 204 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Wireless communication between the RAN 204 and a UE 206 may be described as utilizing an air interface. Transmissions over the air interface from a base station (e.g., base station 208) to a UE (e.g., UE 206) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 206) to a base station (e.g., base station 208) may be referred to as uplink (UL) transmissions. In accordance with further aspects of the present disclosure, the term uplink may refer to a point-to-point transmission originating at a UE (e.g., UE 206).

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 206, which may be a scheduled entity, may utilize resources allocated by the scheduling entity 208.

As illustrated in FIG. 2, a base station or scheduling entity 208 may broadcast downlink traffic 212 to one or more UEs (e.g., UE 206). Broadly, the base station or scheduling entity 208 may be configured as a node or device responsible for scheduling traffic in a wireless communication network, including the downlink traffic 212 and, in some examples, uplink traffic 216 from the UE 206 to the scheduling entity 208. The UE 206 may be configured as a node or device that also receives downlink control information 214, including but not limited to scheduling information (e.g., a grant), synchronization or timing information, or other control information from another entity in the wireless communication network such as the scheduling entity 208. Furthermore, the UE 206 may send uplink control information 218 to the base station 208 including but not limited to scheduling information (e.g., grants), synchronization or timing information, or other control information.

In general, base stations 208 may include a backhaul interface for communication with a backhaul portion 222 of the wireless communication system. The backhaul 222 may provide a link between a base station 208 and the core network 202. Further, in some examples, a backhaul interface may provide interconnection between the respective base stations 208. Various types of backhaul interfaces may be employed, such as a direct physical connection, a virtual network, or the like using any suitable transport network.

The core network 202 may be a part of the wireless communication system 200, and may be independent of the radio access technology used in the RAN 204. In some examples, the core network 202 may be configured according to 5G standards (e.g., 5GC). In other examples, the core network 202 may be configured according to a 4G evolved packet core (EPC), or any other suitable standard or configuration.

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 206, which may be a scheduled entity, may utilize resources allocated by the base station or scheduling entity 208.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
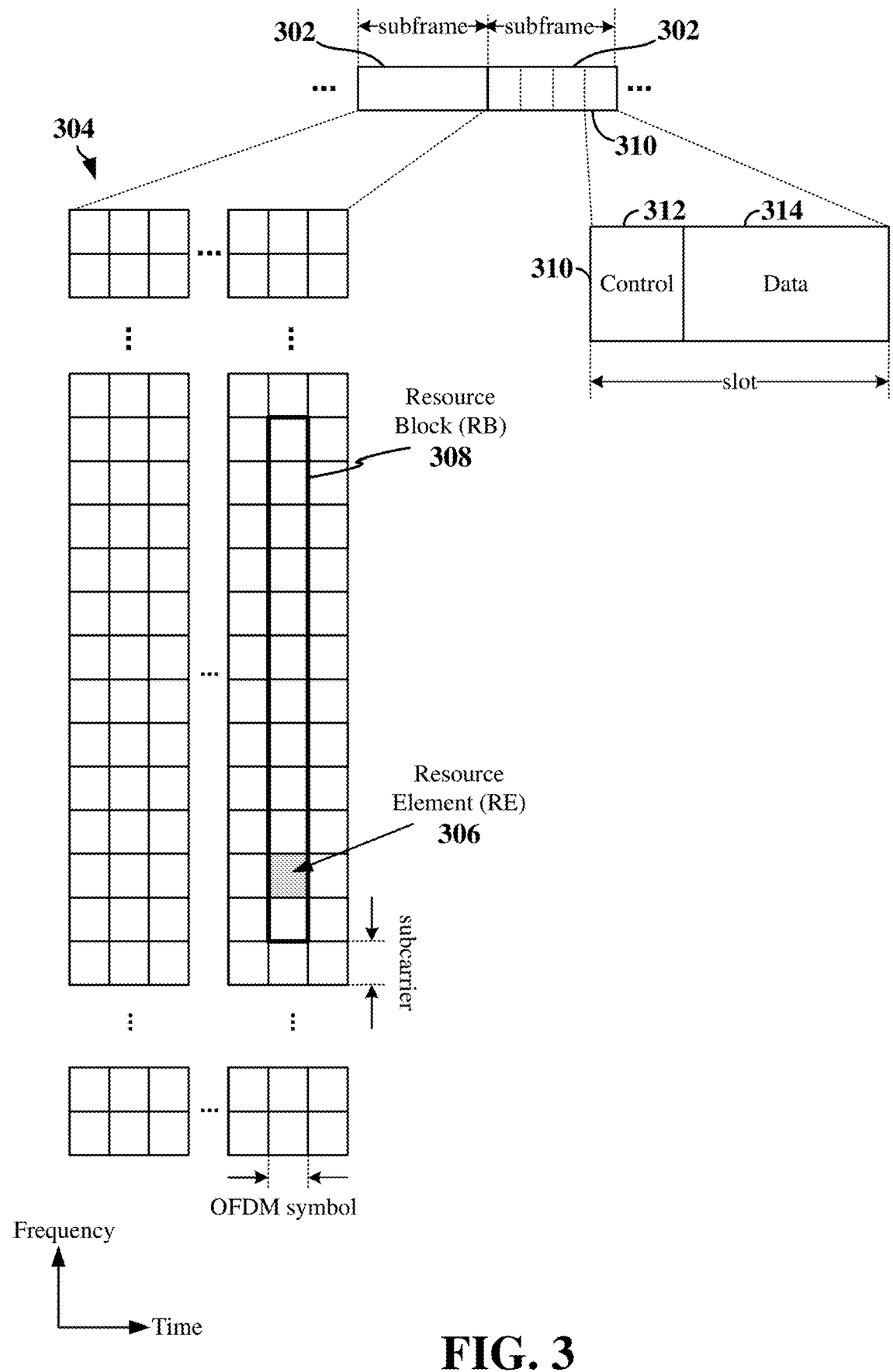
FIG. 3 is a diagram illustrating an example of a frame structure for use in a wireless communication network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier x 1 symbol, is the smallest discrete part of the time-frequency grid, and contains a single complex quantity representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., abase station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

When the signal-to-noise ratio (SNR) of a transmission is low, such as in the example of a UE at the edge of a cell, the quality of the channel estimation at a receiver is limited. In the case of PUCCH reception at a gNB, for example, a low SNR yielding a lower quality channel estimation limits the performance of PUCCH reception, which in turn affects coverage. In order to improve coverage, sequence-based non-coherent transmission may be used instead a channel-coding based scheme, for example. In particular, a transmitter may map a k number of information bits to a sequence from a set of base sequences of a cardinality $2k$. A receiver of such transmissions may then perform a sequence detection from among the known set of base sequences, and thereby recover the information bits based on the detected sequence.

Concerning radio link monitoring (RLM), a scheduled entity or UE may be configured to monitor some reference signals in configured radio link monitoring reference signal (RLM-RS) resources in order to ultimately determine a radio link failure for a particular level of service (e.g., URLLC or eMBB). In some aspects, the RLM-RS resources may include synchronization signal blocks (SSBs) or channel state information reference signals (CSI-RS) in the downlink (DL) as just two examples. However, other reference signals may be used for RLM in a UE (e.g., UE 206), and the present disclosure is not limited to any particular reference signals. The UE may determine link quality parameters from the monitored RLM-RS resources, such as the SNR, as one example, and map or translate these determined parameters to a block error rate (BLER), which is the ratio of erroneous blocks to total received blocks (EB/TB). BLER allows the UE to determine an in-sync (IS) or out-of-sync (OOS) indication at the time the radio link monitoring (RLM) is performed. In some aspects, a two percent target BLER is considered normal for an in-sync condition (a BLERin of 2%), while a ten percent target BLER is considered normal for an out-of-sync condition (a BLERout of 10%), for the PDCCH as specified in 3GPP Technical Specification (TS) 38.133, v16.3.0, for example. The target BLERs may be configured in the UE by the network (e.g., a serving cell base station) through RRC signaling, as one example.

When performing RLM using the RLM-RS resources, a UE may be configured to compute a hypothetical BLER for the PDCCH according to the information derived from the received reference signals (i.e., RLM-RS). This calculated hypothetical BLER may then be compared against the target BLERs to determine whether the current calculated hypothetical BLER indicates a radio link failure depending on whether the BLER indicates in-sync or out-of-sync conditions for the UE in relation to the serving cell. The UE may determine that it is in-sync if the calculated hypothetical BLER is less than or equal to the predetermined BLERin value (e.g., 2%) and that it is out-of-sync if the calculated hypothetical BLER is greater than or equal to the predetermined BLERout value (e.g., 10%). It is noted that the in-sync and out-of-sync percentages above are merely exemplary, and other percentages may be utilized for other use cases for determining in-sync and out-of-sync conditions.

Of note, an actual BLER refers to a BLER measured by a UE. Obtaining an actual BLER, however, may slow down operation of the UE. That is, in order to obtain a reliable actual BLER, the measurement may require around 2000 total receptions. On the other hand, a calculated hypothetical BLER may be computed by a UE based on only one measurement. Accordingly, in some examples a calculated hypothetical BLER is utilized, where the calculation is based on mathematical models or methods to calculate the BLER based on the measured signal strength of a reference signal.

In some examples, as part of the hypothetical BLER calculation, a UE may assume that a control channel is transmitted at a higher power level than a reference signal, and may factor in the higher power level when calculating the BLER. For example, the UE may assume an additional power boost for PDCCH as compared to SSB SNR or CSI-RS SNR, as examples, and may add an SNR offset to the measured SNR. Based on the determination of the BLER, the UE may periodically or persistently (or aperiodically or semi-persistently in other configurations) send an in-sync (IS) indication or an out-of-sync (OOS) indication from a physical layer (e.g., L1) to a higher layer (e.g., L2 or higher) of the UE. Conventionally, the UE does not send L1 or L2 signaling of IS and/or OOS indications to a serving base station (e.g., a gNB).

In some examples the radio link may be satisfactory for other types of services, such as an enhanced mobile broadband (eMBB) service, which has a more lenient BLER target. For example, a URLLC service may have a BLER target of 1% error rate, and an eMBB service may have a BLER target of a 10% error rate. As another example, the UE may detect an RLF for the URLLC service at a 2% error rate, but may not for the eMBB service.

Conventionally, the UE may trigger an RLF determination in response to receiving a downlink (DL) RLM triggered RLF, a random access problem indication from master cell group (MCG) MAC, or an MCG radio link control (RLC) signal indicating that a maximum number of retransmissions has been reached. After an RLF determination, the UE may perform a cell reselection procedure to recover from the RLF by reselecting a cell in which to connect to in order to resume a level of service (e.g., eMBB). In an aspect, the cell reselection procedure may involve the UE searching for and measuring signal quality for a set of neighboring base stations, and then attempting to attach to or connect with one of the neighbor base stations meeting the requisite criteria for the level of service. In another example, the UE may use a random access procedure, such as a random access channel (RACH) procedure, when attempting to attach to or connect with a new base station in order to recover from the RLF.

With regard to URLLC recovery from an RLF, in particular, it is noted that cell reselection or random access selection may not be needed since the link may still be workable for eMBB. For example, the BLER may not meet the URLLC BLER target for in-sync indication, but nonetheless meets the less stringent eMBB BLER target for in-sync indication. Accordingly, in an aspect, the eMBB uplink may be used to transmit a RLF report to the serving cell base station in this instance.

Figure 4:
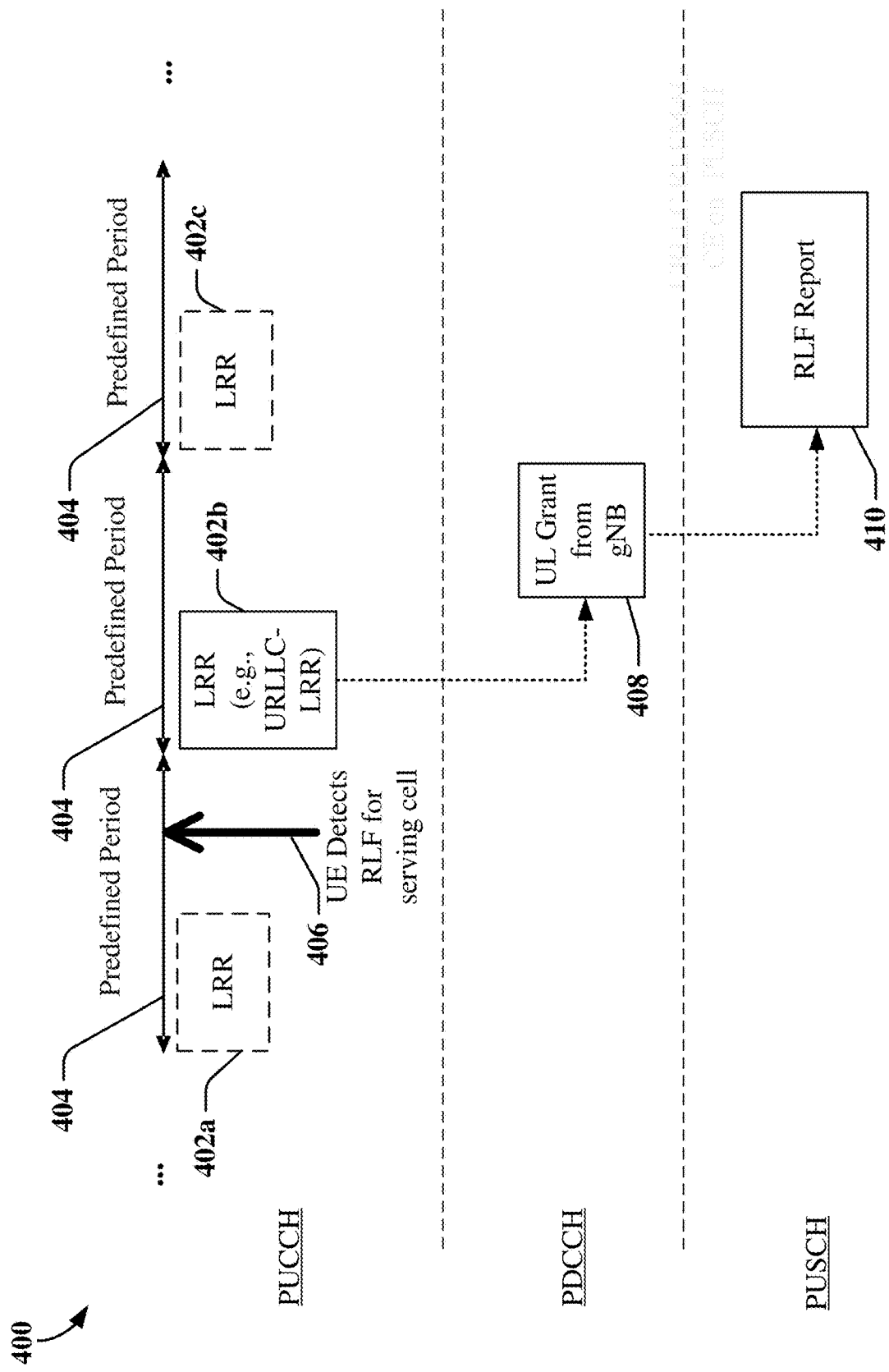
FIG. 4 illustrates a linear timeline of radio link monitoring and radio link failure reporting according to some aspects.

FIG. 4 illustrates a signaling time line 400 of an example process that may be implemented by a scheduled entity or UE to report an RLF for a higher level service, such as URLLC, to a serving cell. In some aspects, it is noted that for each serving cell, a UE may be configured for URLLC radio link monitoring (RLM) with a set of RRC parameters that configure the UE to perform URLLC RLM and radio link failure (RLF) reporting as illustrated in FIG. 4. In a particular aspect, a UE may be configured with a periodic PUCCH resource on a primary cell (PCell) in a master cell group (MCG) (or a primary secondary cell (PSCell) in a secondary cell group (SCG)) that is used to indicate a link recovery request (generally "LRR", and also alternatively termed a "URLLC-LLR" or "uLRR" when applied to URLLC, in particular). It is noted that LRR as used herein may also be functionally equivalent to an indication of a radio link failure (RLF), which further triggers link recovery processes implemented by the network (e.g., the serving cell and the gNB for the serving cell). Hence, LRR, as used herein, refers to both the indication of an RLF and a link recovery request (i.e., RLF+link recovery). Upon receiving the LRR, the network will recognize that the UE has detected a problem with the link quality (e.g., link failure for URLLC), and will initiate a link recovery procedure after receiving a subsequent detailed radio link failure report in the MAC-CE in the PUSCH, which will be discussed below.

In the example of FIG. 4, the periodic PUCCH resource is indicated at blocks 402 (denoted with 402a, 402b, and 402c in this example), which occur at a predetermined periodicity (e.g., predefined time periods 404). In some examples, the PUCCH resource may be aperiodic, semi-persistent, or triggered. It is noted that this resource is scheduled for the PUCCH, but may not be used if RLF is not detected (e.g., as indicated by dashed blocks 402a and 402c, which illustrate that the resource is scheduled but not necessarily used by the UE at each periodic instance or predefined time period). In an aspect, the PUCCH resource 402 may contain one bit of information similar to an SR (scheduling request). Thus, the one bit indication may be used to signal to the serving cell base station that an RLF has been detected and, therefore, link recovery is being requested. Of further note, for URLLC and other high reliability, low latency modes of communication, the predefined period may be configured to be relatively short such as in the range of 1-10 milliseconds, as an example, but not limited to such. A shorter time frame enables the UE to expedite the RLF indication.

Concerning the configuration of the LRR, in particular, this request signal may be designed as a special type of scheduling request (SR). Namely, the LRR may be configured to share the same configuration methods as SR, including the PUCCH resource configuration. In addition, the UE may be configured to use one particular SR configuration for the LRR (e.g., the URLLC-LRR). For URLLC or other high reliability, low-latency communication, the LRR may be configured to have a higher priority than other SRs to ensure that this particular communication is prioritized. Additionally, in the case where URLLC-LRR reporting (i.e., a positive URLLC-LRR) collides or conflicts in time with other SR reporting opportunities, the UE may drop the other SR(s) and transmit the URLLC-LRR.

As illustrated in the time line 400, when a UE detects a radio link failure at time 406 in any serving cell configured with RLM (e.g., with URLLC RLM), the UE transmits an LRR in the next occurring reserved PUCCH resource 402, as shown at 402b. It is noted that RLF detection or determination may be made in accordance with the processes discussed above, such as by calculation of a hypothetical BLER and comparing against target BLERs. Additionally, the RLF may account for two types of service that are both capable of being provided in the communication network. For example, the RLF may indicate that a first type of service having a higher reliability specification and a lower latency specification (e.g., URLLC) has failed but a second type of service with less requirements (e.g., eMBB) is still available for UL communication from the UE to the base station.

In some aspects, this LRR transmission may be made to or designated for reception by the PCell or PSCell base station on the PUCCH. In response to detecting the LRR 402b, the serving cell base station or gNB may transmit an uplink (UL) grant 408 to the UE that communicates to the UE granted UL resources that may be used by the UE to subsequently transmit a more detailed RLF report. In an aspect, the UL grant may be communicated by DCI in the PDCCH, but is not limited to such, and could be communicated with other resources in the PDCCH or PDSCH.

After the receipt of the UL grant indication at 408, the UE may be configured to transmit the RLF report as shown at 410. The RLF report may contain information such as: (1) the serving cell (or cells) on which RLF is detected; (2) other (currently unused) cells that could be used as a cell for providing URLLC; and/or (3) a suggested beam or TCI state to be used in the current serving cell that has experienced radio link failure. In a particular aspect, it is noted that the RLF report may be transmitted via a media access control (MAC) control element (MAC-CE) on the scheduled resources in the PUSCH. Concerning timing of the transmission of the RLF report, the UE may be configured to use the first PUSCH that is scheduled by the serving cell base station.

As mentioned above, in some aspects the UE may be configured with a URLLC RLM configuration on a serving cell when the UE is configured to communicate using URLLC traffic in the serving cell. In the URLLC RLM configuration, the UE may be additionally configured with at least one of (1) reference signals (e.g., SSB or CSI-RS) for link quality measurement, or (2) a predetermined reference signal receive power (RSRP) threshold. In the case of a predetermined RSRP threshold, this threshold may be useful in instances where there may be multiple beams or transmission configuration indicator (TCI) states in the same cell. The UE may determine that a current beam is not sufficient to support URLLC, and may suggest to the network to switch to another beam/TCI state if the other beam's RSRP exceeds the predetermined RSRP threshold. For frequency bandwidths FR1 and FR2, the UE may be connected to multiple transmission-reception points (TRPs), and a TCI-state may correspond to a particular TRP.

In further aspects, a UE may be configured with other serving cells (i.e., backup or secondary cells) that are not being currently used for URLLC. These other serving cells may constitute candidate serving cells in the case that the current URLLC cell fails. In this case, the UE may be configured to perform measurements on these other serving cells as well and send this information to the serving cell base station. In yet further aspects, this measurement may be minimized (e.g., only RSRP is measured) as compared to the RLM on the nominal or currently used URLLC cells.

According to yet further aspects, the RLF report 410 (e.g., the RLF MAC-CE) may be configured with specific MAC-CE designs. In the example discussed above, after the UE sends the LRR 402b and/or receives the uplink grant 408, the UE transmits the RLF report 410 as an RLF MAC-CE in the PUSCH. In some examples, if after detecting RLF on a serving cell, the UE has access to uplink resources for transmitting on the PUSCH and the PUSCH has enough available resources to carry the MAC-CE, then the UE may be configured to simply transmit the RLF MAC-CE on the existing PUSCH, without sending the LRR. In other examples, the RLF MAC-CE may be configured to indicate, for each of the configured serving cells (i.e., cells of this MAC entity), whether or not a serving cell is detected with URLLC RLF. Of further note, for cells that the UE is not configured with URLLC, for example, the UE may be configured to indicate whether or not the cell suffers from RLF. Additionally, on such cells that the UE is not configured with URLLC, the UE may also indicate whether the cell can be used as a URLLC cell.

Figure 5:
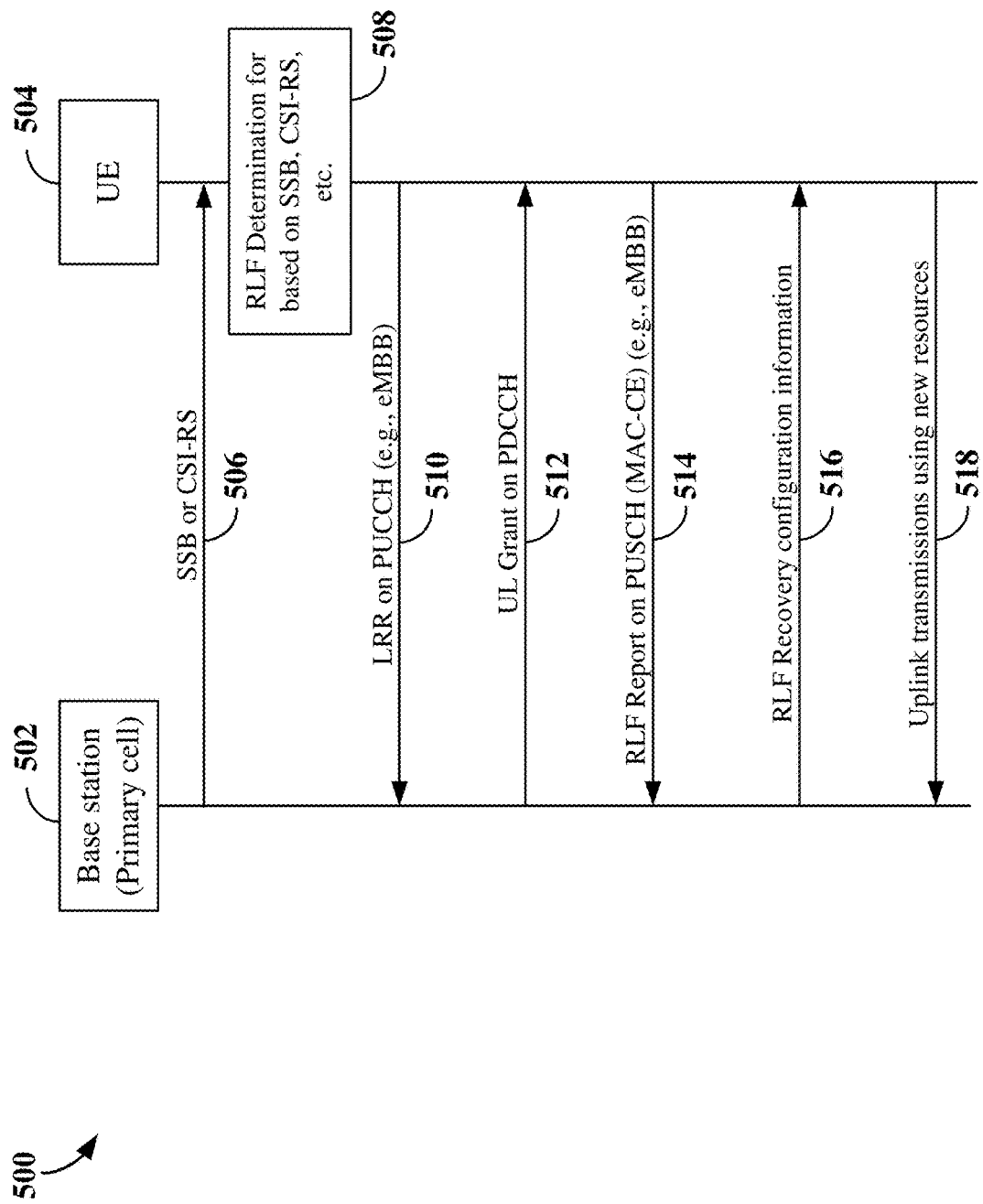
FIG. 5 is a call flow diagram illustrating an example of radio link monitoring and link recovery request signaling according to some aspects.

FIG. 5 illustrates a call flow diagram 500 illustrating an example of RLM including RLF determination and reporting according to some aspects. In the example shown in FIG. 5, a scheduling entity or base station 502 (e.g., a primary cell) is in wireless communication with a UE or scheduled entity 504. The base station 502 may correspond to any of the scheduling entities or base stations shown in FIGS. 1 and 2. The UE 504 may correspond to any of the scheduled entities or UEs shown in FIGS. 1 and 2. At 506, one or more reference signals (e.g., SSB or CSI-RS) may be transmitted from the base station 502 to the UE 504. As shown in block 508, the UE 504 may perform RLM based on the SSB or CSI-RS (or other RS). In the event of a link failure for a first type of service (e.g., URLLC link BLER is above a BLER target), an RLF is determined in the UE and a link recovery request (LRR) is sent from the UE 504 to the base station 502 as shown by signaling 510. In an aspect, the LRR is transmitted on reserved or configured resources in the PUCCH, such as the resources shown at 402 in the example of FIG. 4. Additionally, these configured resources may be allocated according to a repeating period as also shown previously in FIG. 4 at 404, although not limited to such. In the case where there are two types of service (e.g., URLLC and eMBB), the LRR transmission 510 may utilize the second type of service, such as eMBB. As discussed earlier, the LRR transmission may constitute a single bit in the PUCCH.

Upon receiving the LRR signaling 510, the base station 502 may send a UL grant to the UE 504 as shown at 512. In an example, the UL grant may be sent via the PDCCH, but is not limited to such. As discussed earlier with regard to UL grant 408 in FIG. 4, the UL grant 512 may indicate the allocation or reservation of resources on the PUSCH for the subsequent transmission of an RLF report as shown at 514. In an example, the RLF report at 514 may be configured as a MAC-CE and contain various measurements concerning the link quality measurements and/or suggestions for TCI state or beam changes as discussed above, but is not limited to such. In some examples, the RLF report may be transmitted utilizing the second type of service (e.g., eMBB) when the first type of service (e.g., URLLC) has experienced radio link failure.

In some examples, the serving cell base station 502 may respond to the RLF report 514 by transmitting RLF recovery configuration information, which may include the allocation of new resources (or a different beam and/or TCI state) to the UE 504 for recovery of the radio link for the first type of service (e.g., URLLC) as shown at 516. After this information is received and configured in the UE 504, the uplink transmissions using the first type of service (e.g., URLLC) may resume as shown at 518.

Figure 6:
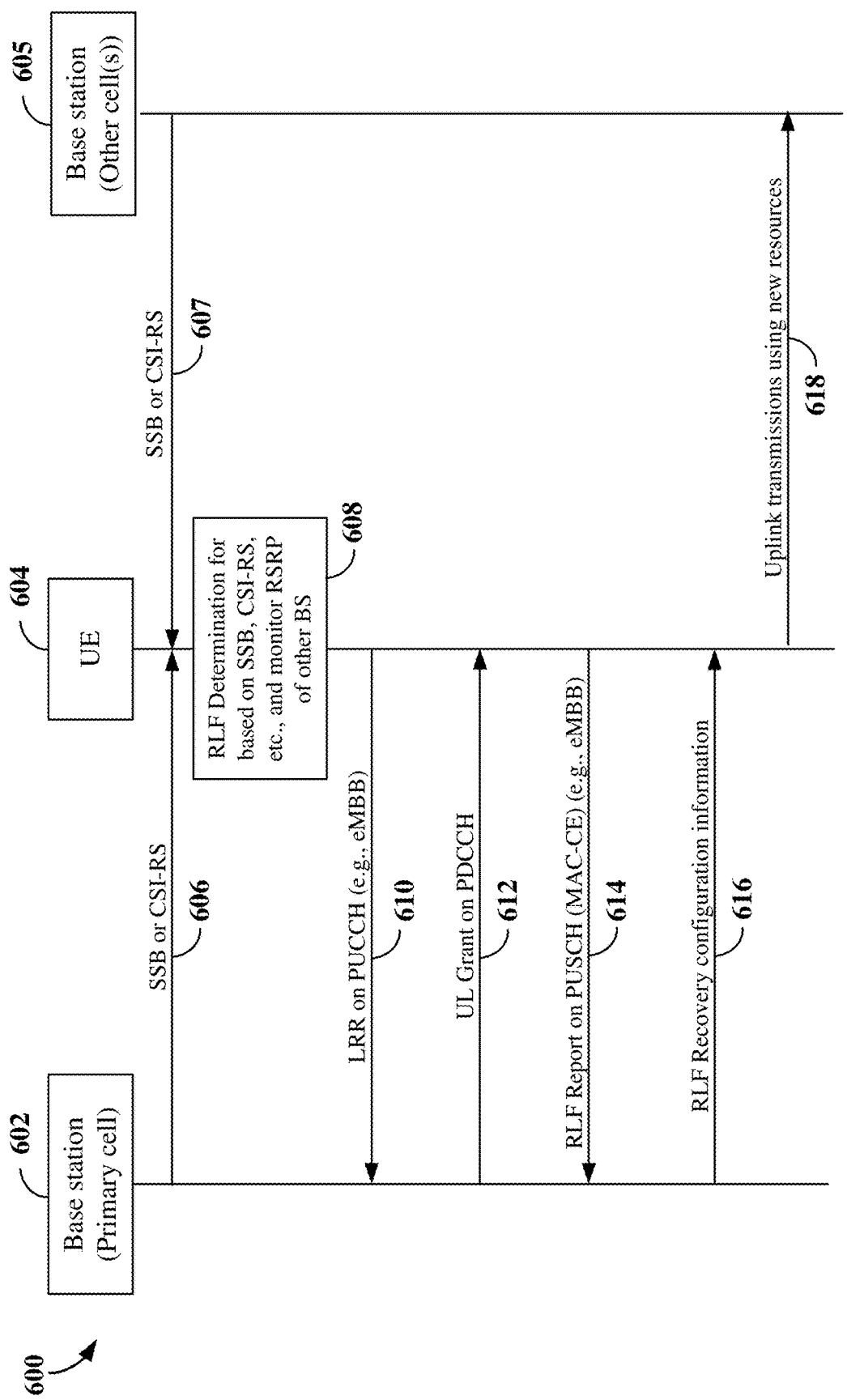
FIG. 6 is a call flow diagram illustrating another example of radio link monitoring and link recovery request signaling according to some aspects.

FIG. 6 illustrates a call flow diagram 600 illustrating another example of RLM including RLF determination and reporting according to some aspects. In the example shown in FIG. 6, a scheduling entity or base station 602 (e.g., a primary cell) is in wireless communication with a UE or scheduled entity 604. Additionally, the UE 604 may be configured to monitor one or more other cells or base stations as illustrated with base station 605 that may be potential candidate cells in the event of a RLF. The base station 605 may be a secondary cell (SCell) controlled by the primary cell 602 in a MCG, and the UE 604 is configured to monitor the SCell. Alternatively, if the UE 604 is configured with a Secondary Cell Group (SCG), the base station 605 may be a Primary SCG Cell (PSCell), which the UE 604 may also radio link monitor.

At 606, one or more reference signals (e.g., SSB or CSI-RS) may be transmitted from the base station 602 to the UE 604. Similarly, the UE 604 may monitor one or more reference signals (e.g., SSB or CSI-RS) 607 transmitted from the base station 605. As shown in block 608, the UE 604 may perform RLM of both base station 602 and base station 605 based on the SSBs or CSI-RS s (or other RS). In an example, the UE 604 may monitor the RSRP of the reference signals from the base station 605.

Similar to the processes in FIG. 5, in the event of a link failure for a first type of service (e.g., URLLC link BLER is above the BLER target) from the base station 602, an RLF is determined in the UE and a link recovery request (LRR) is sent from the UE 604 to the base station 602 as shown by signaling 610, which may be sent on a second type of service (e.g., eMBB). Upon receiving the LRR signaling 610, the base station 602 may send a UL grant to the UE 604 as shown at 612. Next, the UE may transmit an RLF report as shown at 614. In an aspect, the RLF report 614 may contain various measurements concerning the link quality measurements and/or suggestions for TCI state or beam changes as discussed before, but is not limited to such. Additionally, the RLF report 614 may include the RSRP measurement for the base station 605, which may be a candidate base station for resuming the first type of service (e.g., URLLC) if the UE is configured for this level of service from the base station 605.

In this example, the serving cell base station 602 may respond to the RLF report 614 by issuing RLF recovery configuration information, which may include the allocation of new resources to the UE 604 from the base station 605 for recovery of the radio link for the first type of service (e.g., URLLC) as shown at 616. After this information is received and configured in the UE 604, the uplink transmissions using the first type of service (e.g., URLLC) may resume through communication with the base station 605 as shown at 618.

Figure 7:
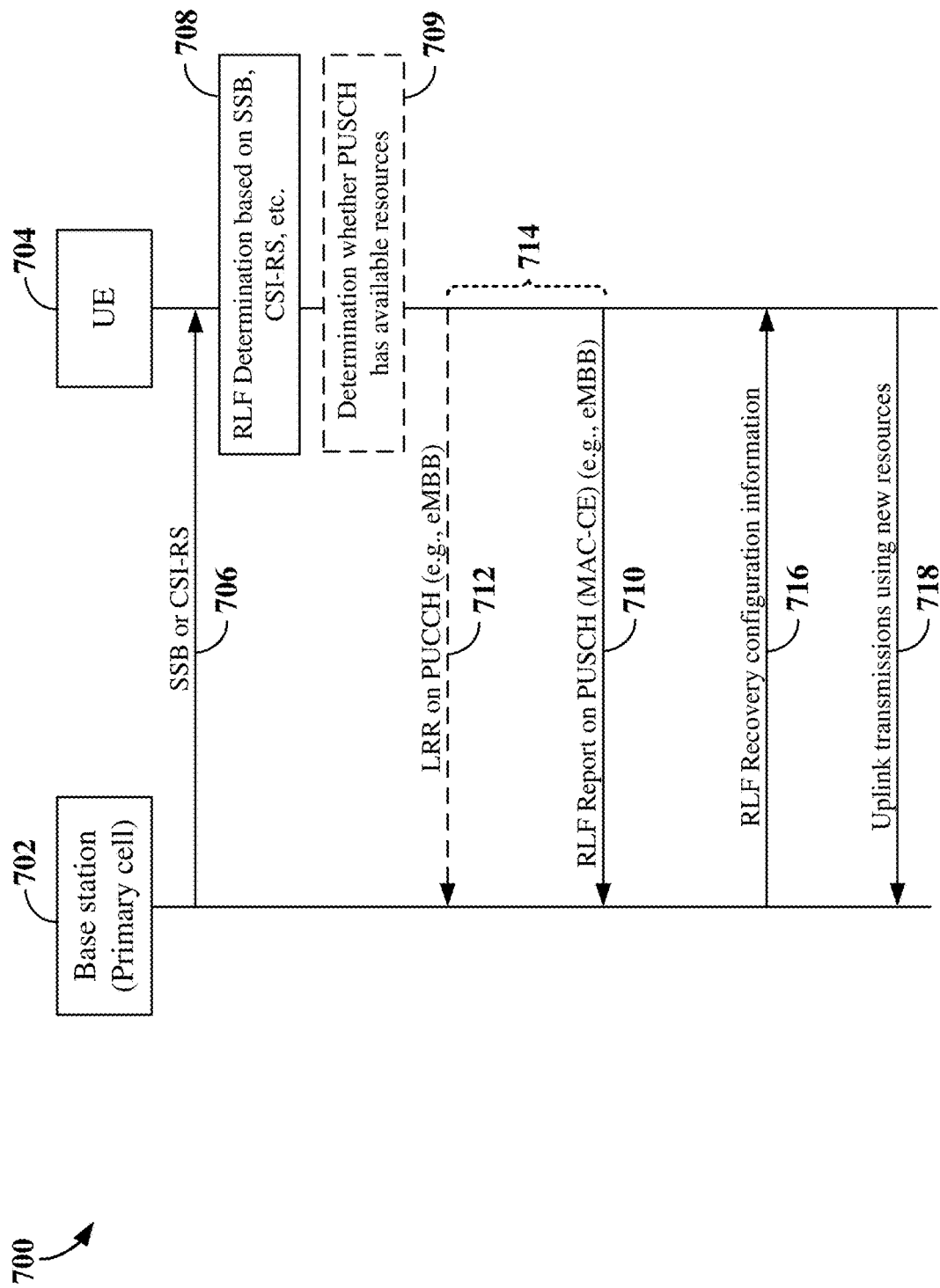
FIG. 7 is a call flow diagram illustrating yet another example of radio link monitoring and link recovery request signaling according to some aspects.

FIG. 7 illustrates a call flow diagram 700 illustrating still another example of RLM including RLF determination and reporting according to some aspects. In the example shown in FIG. 7, a scheduling entity or base station 702 (e.g., a primary cell) is in wireless communication with a UE or scheduled entity 704. The base station 702 may correspond to any of the scheduling entities or base stations shown in FIGS. 1 and 2. The UE 704 may correspond to any of the scheduled entities or UEs shown in FIGS. 1 and 2. As shown at 706, one or more reference signals (e.g., SSB or CSI-RS) may be transmitted from the base station 702 to the UE 704. As shown in block 708, the UE 704 may perform RLM based on the SSB or CSI-RS (or other RS) in order to determine if there is a RLF for the first type of service (e.g., URLLC). In the event of a link failure detection for the first type of service (e.g., the URLLC link BLER is above a BLER target), an RLF is determined in the UE. Additionally, in some examples, UE 704 may determine whether the UE has uplink resources available to transmit on the PUSCH, and further whether the PUSCH has resources to carry a MAC-CE for a RLF report as shown in block 709. If so, then the UE 704 can transmit the RLF report on the PUSCH in a MAC-CE as shown at 710, and without sending an LRR as was discussed earlier. In a further aspect, the RLF report may be transmitted on the PUSCH using a second type of service (e.g., eMBB communication), which is still available even though an RLF has been determined for the first type of service (e.g., URLLC).

In another example also illustrated in FIG. 7, which is similar to the example of FIG. 5, an LRR may be transmitted on the PUCCH as shown at 712 after the determination of the RLF in block 708. In this example, the UE 704 may not wait for an UL grant from the base station 702, but rather may transmit the RLF report on the PUSCH at 710 after a predetermined time period has tolled (e.g., the predetermined time period has passed) as shown by bracket 714. In an aspect, the LRR 712 is transmitted on reserved or configured resources in the PUCCH, such as the resources shown at 402 in the example of FIG. 4. Additionally, these configured resources may be allocated according to a repeating period or predefined time period as also shown previously in FIG. 4 at 404, although not limited to such. In the case where there are two types of service (e.g., URLLC and eMBB), the LRR transmission 712 and the RLF report transmission 710 may utilize the second type of service, such as eMBB.

In either example discussed above (e.g., determining whether the PUSCH has resources for the RLF MAC-CE without sending an LRR or transmitting the LRR on the PUCCH followed by transmission of the RLF report on the PUSCH without waiting for a UL grant in response to the LRR), the serving cell base station 702 is configured to respond to the RLF report 710 with RLF recovery configuration information. The RLF recovery configuration information may include the allocation of new resources (or a different beam and/or TCI state) to the UE 704 for recovery of the radio link for the first type of service (e.g., URLLC) as shown at 716. After this information is received and configured in the UE 704, uplink transmissions using the first type of service (e.g., URLLC) may resume as shown at 718.

Figure 8:
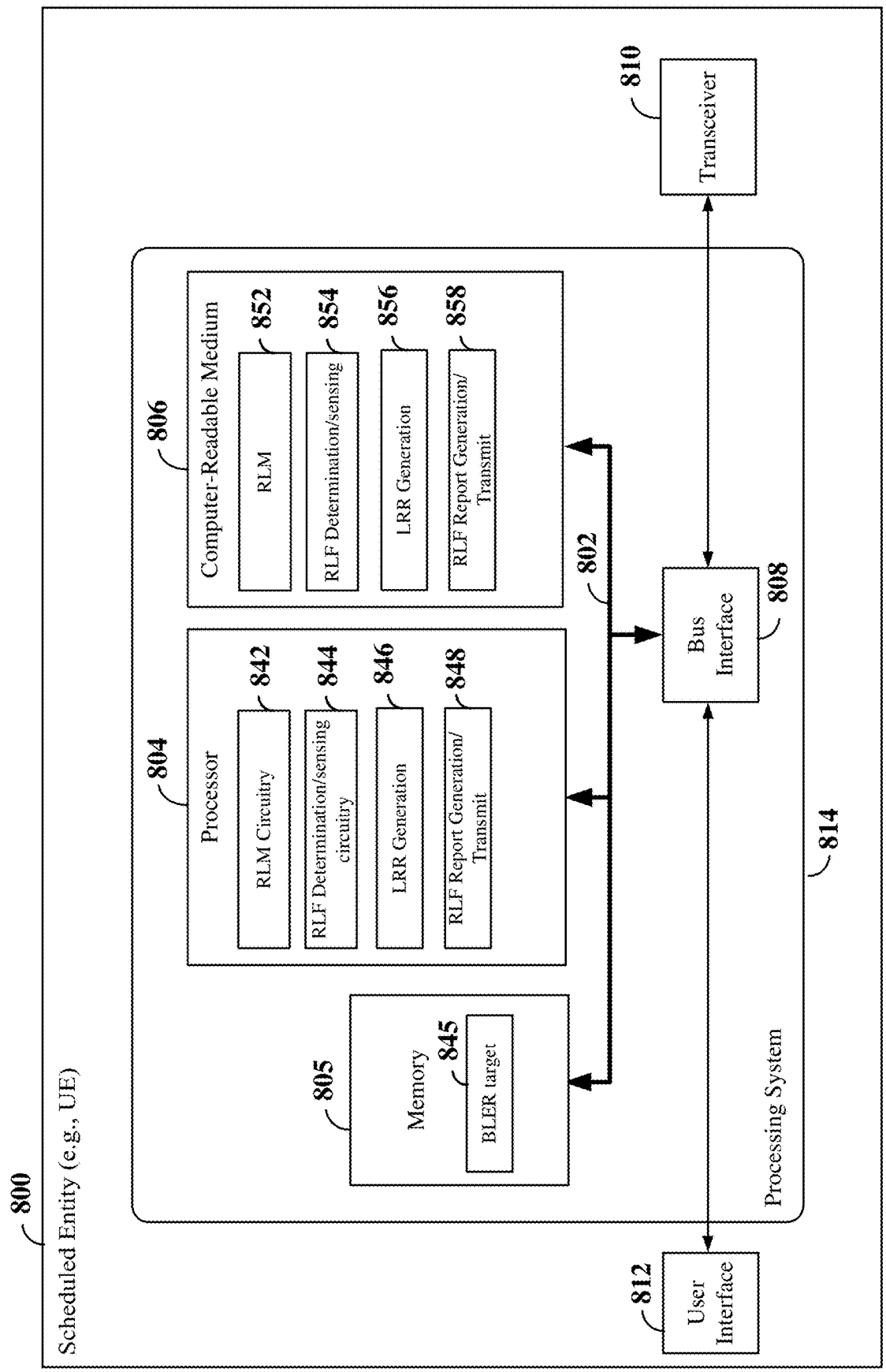
FIG. 8 is a block diagram illustrating an example of a hardware implementation for a scheduled entity employing a processing system according to some aspects.

FIG. 8 is a block diagram illustrating an example of a hardware implementation for a scheduled entity 800 employing a processing system 814. For example, the scheduled entity 800 may correspond to any of the UEs or scheduled entities shown and described above in reference to FIG. 1, 2, or 5-7.

In accordance with various aspects of the disclosure, an element, or any portion of an element, or any combination of elements may be implemented with a processing system 814 that includes one or more processors 804. Scheduled entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduled entity 800 may be configured to perform any one or more of the functions described herein. That is, the processor 804, as utilized in a scheduled entity 800, may be used to implement any one or more of the processes described herein. The processor 804 may in some instances be implemented via a baseband or modem chip and in other implementations, the processor 804 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium (e.g., an air interface using wireless RF transmission). A user interface 812 (e.g., keypad, display, touchscreen, speaker, microphone, control knobs, etc.) may also be provided. Of course, such a user interface 812 is optional, and may be omitted in some examples.

The processor 804 is responsible for managing the bus 802 and general processing, including the execution of software stored on the computer-readable medium 806. The software, when executed by the processor 804, causes the processing system 814 to perform the various functions described herein for any particular apparatus. The computer-readable medium 806 and the memory 805 may also be used for storing data that is manipulated by the processor 804 when executing software.

One or more processors 804 in the processing system 814 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. In some examples, the computer-readable medium 806 may be part of the memory 805. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects, the processor 804 may include circuitry configured for various functions. For example, the processor 804 may include radio link monitoring (RLM) circuitry 842, configured to perform various functions for radio link monitoring, including URLLC link(s) monitoring. In aspects, the RLM circuitry 842 may be configured to monitor one or more serving cells, such as through monitoring downlink channels from network devices such as base station, gNBs, or other scheduling entities. Moreover, the RLM circuitry 842 may be configured to receive RRC messaging from a scheduling entity, which includes information for configuring the scheduled entity 800 including configurations for RLM. Further, the RLM circuitry 842 may be configured to monitor various reference signaling or synchronization signaling such as CSI-RS and SSB signals from the scheduling entity via transceiver 810. Moreover, RLM circuitry 842 may determine or calculate various link quality measurements according to the various link quality determination discussed herein. In other aspects, RLM circuitry 842 may implement, at least in part, the processes in block 902 of FIG. 9 or block 1002 of FIG. 10, which will be discussed below. Additionally, RLM circuitry 842 may be configured to monitor a plurality of serving cells (or potential serving cells), such as was shown in the example of FIG. 6 above. The RLM circuitry 842 may further be configured to execute RLM software 852 stored in the computer-readable medium 806 to implement one or more of the functions described herein.

The processor 804 may further include radio link failure (RLF) determination or sensing circuitry 844, configured to determine or sense when an RLF occurs for a particular radio link (e.g., the URLLC link). In some examples, RLF determination or sensing circuitry 844 may be in communication with RLM circuitry 842 for receiving various quality measurement information concerning the link being monitored. The RLF determination or sensing circuitry 844 may further be configured to determine or detect RLF based on the quality measurement information. For example, the RLF determination circuitry 844 may calculate a hypothetical BLER based on the quality measurement information from RLM circuitry 842. Moreover, the RLF determination or sensing circuitry may compare the calculated hypothetical BLER with a target BLER, which may be stored in memory 805 as shown by BLER target information 845. The RLF determination or sensing circuitry 844 may further be configured to execute RLF determination/sensing software 854 stored in the computer-readable medium 806 to implement one or more of the functions described herein.

The processor 804 may further include link recovery request (LRR) generation circuitry 846, configured to generate an LRR when the RLF determination circuitry 844 determines an RLF. In aspects, LLR generation circuitry 846 may utilize a reserved periodic or predefined period resource on the PUCCH as discussed above, wherein the LLR is sent within the reserved resource. Furthermore, the LRR may constitute either a recovery request or an RLF indication, or both. In some aspects, the LLR generation circuitry 846 may configure the LRR as a one bit indication that signals to the network over the PUCCH that RLF has occurred and that a further RLF report will be transmitted by the UE and that recovery resources will need to be allocated for recovery of the desired link (e.g., a URLLC link). Still further, the LLR generation circuitry 846 may be in communication with transceiver 810 or at least cause transceiver 810 to transmit the LLR to a base station or gNB using the PUCCH, as an example. The LLR generation circuitry 846 may further be configured to execute LLR generation software 856 stored in the computer-readable medium 806 to implement one or more of the functions described herein.

In yet further aspects, processor 804 may include RLF report generation and transmit circuitry 848 configured to generate and transmit an RLF report in accordance with the various configured RLF reports discussed herein. In an aspect, the RLF report may be configured by the RLF report generation and transmit circuitry 848 as a MAC-CE for transmission on the PUSCH. The RLF report generation and transmit circuitry 848 may be configured to transmit or send the report to the transceiver 810 for transmission after reception of a UL grant from a base station or scheduling entity, to send out after a predetermined time period after the transmission of an LRR, or to transmit the report if a determination is made that PUSCH resources are available to the device 800, such as shown in the processes of block 1006 in FIG. 10 to be discussed later. The RLF report generation and transmit circuitry 848 may further be configured to execute RLF report generation and transmit software 858 stored in the computer-readable medium 806 to implement one or more of the functions described herein.

Figure 9:
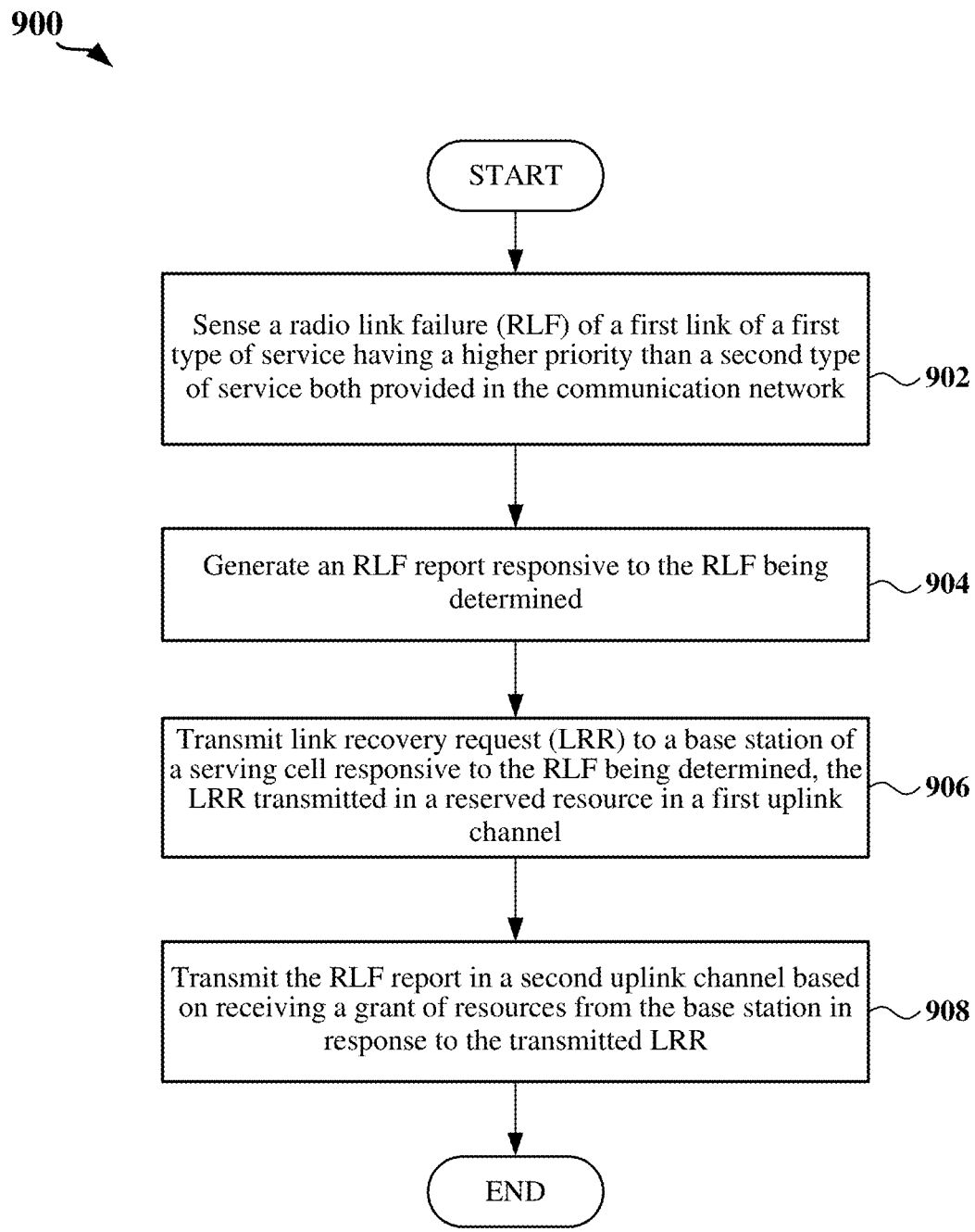
FIG. 9 is a flow chart of an example method for radio link monitoring and link recovery request signaling at a UE according to some aspects.

FIG. 9 is a flow chart of an example method 900 for radio link monitoring and link recovery request signaling at a UE according to some aspects. In some examples, the method 900 may be performed by scheduled entities or UEs such as illustrated in FIG. 1, 2, or 5-8, by a processor or processing system, or by any suitable means for carrying out the described functions.

As shown at block 902, method 900 includes sensing or determining a radio link failure (RLF) of a first link of a first type of service having a higher priority than a second type of service, where both the first and second types of service are capable of being provided in the communication network. In some aspects, it is noted that the first type of service with higher priority is a service having a higher reliability specification and a lower latency specification than the second type of service. For example, the first type of service is URLLC service and the second type of service is eMBB service. Additionally, the first link may be the URLLC link between the UE and a currently serving cell. In an aspect, the RLF determination/sensing circuitry 844, as well as the addition of RLM circuitry 842 in some aspects, and/or software 852 and 854 shown and described above in connection with FIG. 8 or equivalents thereof, may provide means for sensing or determining the RLF of the first link.

Method 900 further includes generating an RLF report responsive to the RLF being determined as shown at block 904. In an aspect, the RLF determination/sensing circuitry 844 and/or software 854 shown and described above in connection with FIG. 8 or equivalents thereof, may provide means for generating the RLF report responsive to the RLF being determined.

Method 900 also includes transmitting a link recovery request (LRR) to a base station of a serving cell when the RLF is determined, where the LRR transmitted in a reserved resource in a first uplink channel as shown at block 906. As discussed above, the LRR may include a single bit and the reserved resource may be a periodically occurring reserved resource on the PUCCH. Further, in some examples, the LRR transmission in block 906 utilizes the second type of service, which may be eMBB service as an RLF for URLLC has occurred. In an aspect, LLR generation circuitry 846 and/or software 856 shown and described above in connection with FIG. 8 or equivalents thereof, may provide means for generating the LRR. Still further, LLR generation circuitry 846 and/or software 856 may further provide means for transmitting the LRR to a base station of a serving cell responsive to the RLF being determined, where the LRR transmitted in a reserved resource in the first uplink channel. Additionally, the means for transmitting the LLR may also include transceiver 810 as well in some aspects. It is further noted here that the processes of block 904 may be performed concomitantly with the processes of block 906 and does not necessarily need to be completed before the processes of block 906 as shown in FIG. 9.

Furthermore, method 900 includes in block 908 transmitting the RLF report in a second uplink channel based on receiving a grant of resources from the base station in response to the transmitted LRR. For example, in an aspect, the UE may receive either the UL grant 512 or 612 in FIGS. 5 and 6. Further, in some examples, the grant is transmitted on the PDCCH and utilizes the second type of service (e.g., eMBB service). Additionally, after receiving the grant, the RLF report is then transmitted as illustrated by 514 or 614 in FIGS. 5 and 6. In some aspects, RLF report generation and transmit circuitry 848 and/or software 858 in FIG. 8 as an example, or equivalents thereof, may provide means for transmitting the RLF report in the second uplink channel based on receiving the grant of resources from the base station in response to the transmitted LRR. Additionally, a scheduled entity such as UE 800 may include means for generating the RLF report when the RLF is determined and may be implemented by RLF report generation and transmit circuitry 848 and/or software 858 in FIG. 8 as an example, or equivalents thereof.

According to other aspects, method 900 includes transmitting the RLF report using a media access control (MAC) control element (MAC-CE) on the second uplink channel (e.g., PUSCH using eMBB service). Additionally, the method 900 may include that the RLM in the UE is configured with RRC signaling from the base station of the serving cell. In some examples, the base station will configure RRC parameters for URLLC RLM on a cell including the RLF report parameters, as discussed above, and the PUCCH resource to be used by the UE to indicate the LRR.

In yet other aspects, method 900 may include determining the RLF by monitoring one or more reference signals on the first link, and then determining a link quality measurement based on the monitored one or more reference signals. These one or more reference signals may include a synchronization signal block (SSB) or a channel state information reference signal (CSI-RS), according to some aspects. Additionally, method 800 may include determining the RLF through determining the link quality measurement by determining or calculating a hypothetical block error rate (BLER) for a physical downlink control channel (PDCCH) of the first link based on the monitored one or more reference signals, which was discussed earlier. The calculated hypothetical BLER may then be compared to a target BLER to determine if the first radio link has failed, such as exceeding an OOS BLER target for URLLC.

According to still further aspects, it is noted that method 900 may include configuring the RLF report to include one or more of: (1) link quality measurements of the first link from the serving cell; (2) channel measurements of one or more other serving cells that are potential candidate cells for recovery of the first type of service; (3) a suggested beam of the serving cell for recovery of the first type of service; or (4) a suggested transmission configuration indicator (TCI) state for recovery of the first type of service. Additionally, it is noted that channel measurements of one or more other serving cells that are potential candidate cells for recovery of the first type of service include measurement of reference signal received power (RSRP) in order to minimize the processing burden in the UE.

In other aspects, method 900 may include measuring a reference signal received power (RSRP) for the first link (e.g., the URLLC service), comparing the measured RSRP with a predetermined threshold, and then determining the RLF when the RSRP is below the predetermined threshold. In yet other aspects, method 900 may include determining the RLF when one of at least one beam or a transmission configuration indicator (TCI) state of the serving cell does not support the first type of service based on the measured RSRP being below the predetermined threshold.

In other aspects, method 900 may include the LRR being configured as a scheduling request (SR), which is further an SR on a physical uplink control channel (PUCCH) resource. In other aspects, the LRR may be configured as an SR that has a higher priority than other scheduling requests issued by the UE. Additionally, the UE may be configured to drop the other scheduling requests when the LRR is sent in order to prioritize or defer to the LRR.

According to still more aspects, the method 900 may include monitoring a plurality of serving cells, not just the active or current serving cell. In this case, the RLF report may be configured as a MAC-CE that indicates for each of the plurality of serving cells whether or not a radio link failure is detected for the first type of service from each respective cell of the plurality of cells. Additionally, the method 900 may include indicating radio link failure in the RLF report for those serving cells in the plurality of serving cells that are configured with the first type of service for the UE. In still another aspect, the UE may be configured to indicate in the RLF report that serving cells in the plurality of serving cells that are not configured with the first type of service for the UE are potential serving cells for the first type of service.

Method 900 may also include the first uplink channel and the second uplink channel utilizing the first type of service on at least one other serving cell when the RLF of the first link is determined. In one example of this case, if there are multiple serving cells configured at the UE, the UE may detect RLF for first type of service (e.g., URLLC) in one cell. Notwithstanding, the PUCCH or PUSCH channel transmissions may be on at least one other different cell (e.g., another second Pcell) still capable of the first type of service (e.g., URLLC transmission on the second PCell for PUCCH/PUSCH).

Figure 10:
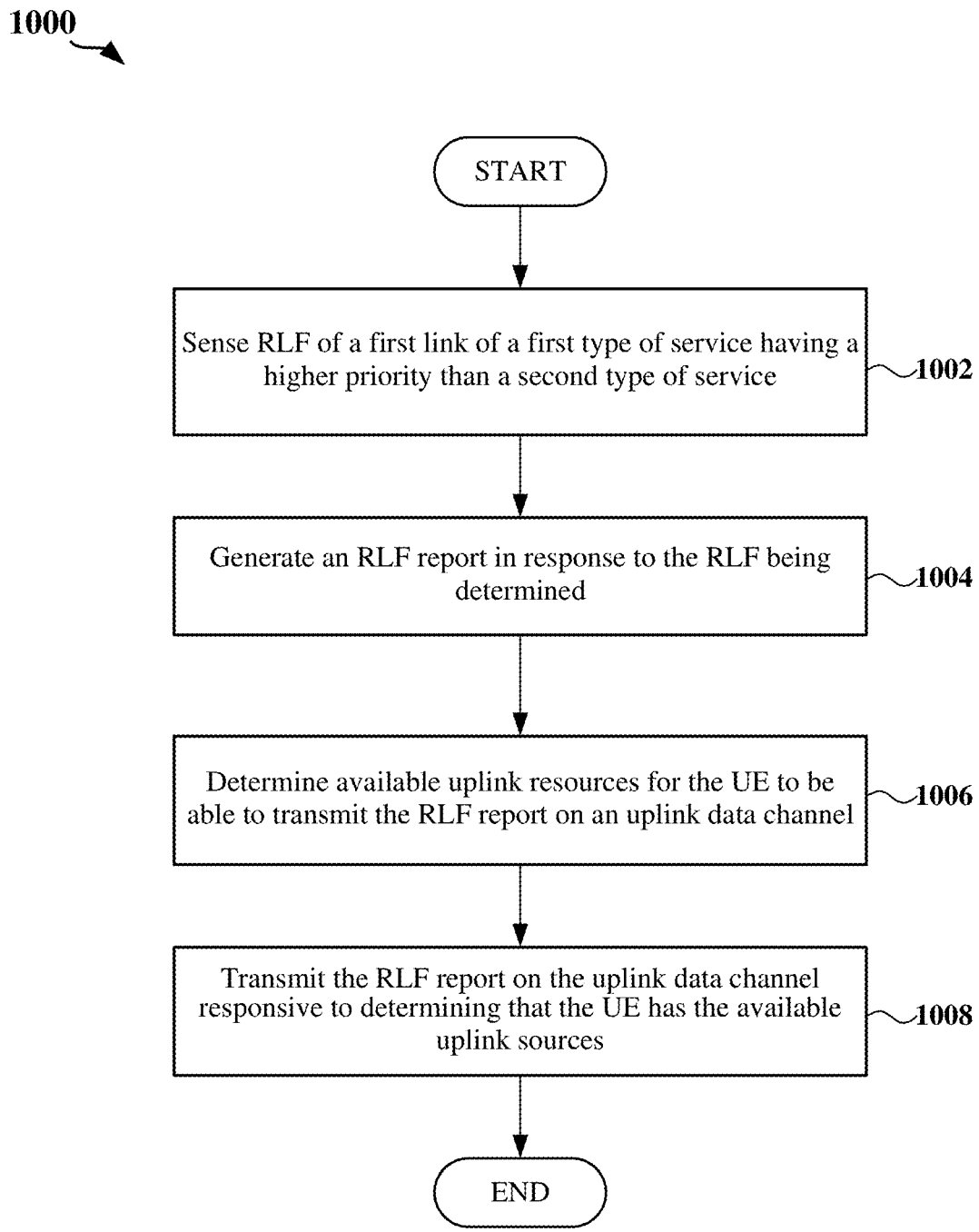
FIG. 10 is a flow chart of an example method for radio link monitoring and link recovery request signaling at a UE according to some aspects.

FIG. 10 illustrates a flow chart of another example method 1000 for radio link monitoring and link recovery request signaling at a UE according to some aspects. In some examples, the method 1000 may be performed by scheduled entities or UEs such as illustrated in FIG. 1, 2, or 7, by scheduled entity 800 described above in connection with FIG. 8, by a processor or processing system, or by any suitable means for carrying out the described functions.

As illustrated, method 1000 includes sensing for determining a radio link failure (RLF) of a first link of a first type of service having a higher priority than a second type of service that are both capable of being provided in the communication network as shown at block 1002. In some aspects, it is noted that the first type of service with higher priority is a service having a higher reliability specification and a lower latency specification than the second type of service. In other aspects, the processes of block 1002 may include the first type of service being URLLC and the second type of service being eMBB. Additionally, the determination of the RLF may be accomplished using any of the methods disclosed herein including a BLER hypothetical calculation and a comparison of the calculated hypothetical BLER with a target BLER. In an aspect, the RLF determination/sensing circuitry 844, as well as the addition of RLM circuitry 842 in some aspects, and/or software 852 and 854 shown and described above in connection with FIG. 8 or equivalents thereof, may provide means for sensing or determining the RLF of the first link.

Method 1000 also includes generating an RLF report in response to the RLF being determined as shown in block 1004. The generation of the RLF may be in accordance with any of the methods previously disclosed herein. Additionally, the information within the RLF report may include one or more of the various data or information disclosed before. In an aspect, the RLF determination/sensing circuitry 844 and/or software 854 shown and described above in connection with FIG. 8 or equivalents thereof, may provide means for generating the RLF report responsive to the RLF being determined.

As further shown in block 1006, method 1000 also includes determining available uplink resources for the UE to be able to transmit the RLF report on an uplink data channel such as the PUSCH in one example. In aspects, the determination in block 1006 may allow the UE transmit the RLF report without transmitting an LRR and/or receiving an UL grant from the base station when the UL resources are determined to be extant. In an aspect, the RLF determination/sensing circuitry 844 and/or software 854 shown and described above in connection with FIG. 8 shown and described above in connection with FIG. 8 or equivalents thereof including other circuitry such as an uplink resource detection/calculation circuitry or MAC layer grant manager, may provide means for determining available uplink resources for the UE to be able to transmit the RLF report on an uplink data channel.

In some aspects, it is noted that the scheduled entity or UE may determine whether uplink resources are available using a MAC layer grant manager, which determines if the UE has an uplink grant (e.g., either a dynamic grant received in a DCI or a configured grant received in RRC). At any given time, the MAC layer grant manager of the UE is able to determine whether or not there are uplink resources available for the UE to transmit uplink traffic. Thus, after detecting the RLF, if the UE determines that there are available uplink resources to transmit on the PUSCH, the UE may put the URLLC RLF MAC-CE on the available PUSCH, regardless of the original purpose of the PUSCH. For example, if the base station had previously provided an UL grant for the UE to transmit particular data, upon detection of the RLF, the UE will place the MAC-CE in the scheduled PUSCH, and may also place the MAC-CE along with the particular data that the base station was expecting.

Method 1000 further includes transmitting the RLF report on the uplink data channel when the UE has determined that the UE has the available uplink resources as shown at block 1008. In an aspect, the RLF report is transmitted on the PUSCH, but is not necessarily limited to such. Additionally, it is noted that the timing of the RLF report transmission may be when the available uplink resources first become available on the PUSCH. In some aspects, RLF report generation and transmit circuitry 848 and/or software 858 in FIG. 8 as an example, or equivalents thereof, may provide means for transmitting the RLF report on the uplink data channel.

In further aspects, method 1000 may include that the determining available uplink resources for the UE to transmit the RLF report on the uplink data channel further includes determining whether the uplink data channel has available resources to carry a MAC-CE for transmitting the RLF report. Further, method 1000 may include that the uplink data channel comprises a physical uplink shared data channel (PUSCH). In yet a further aspect, method 1000 may include transmitting the RLF report on the PUSCH using the second type of service when the RLF has been sensed for the first type of service.

Figure 11:
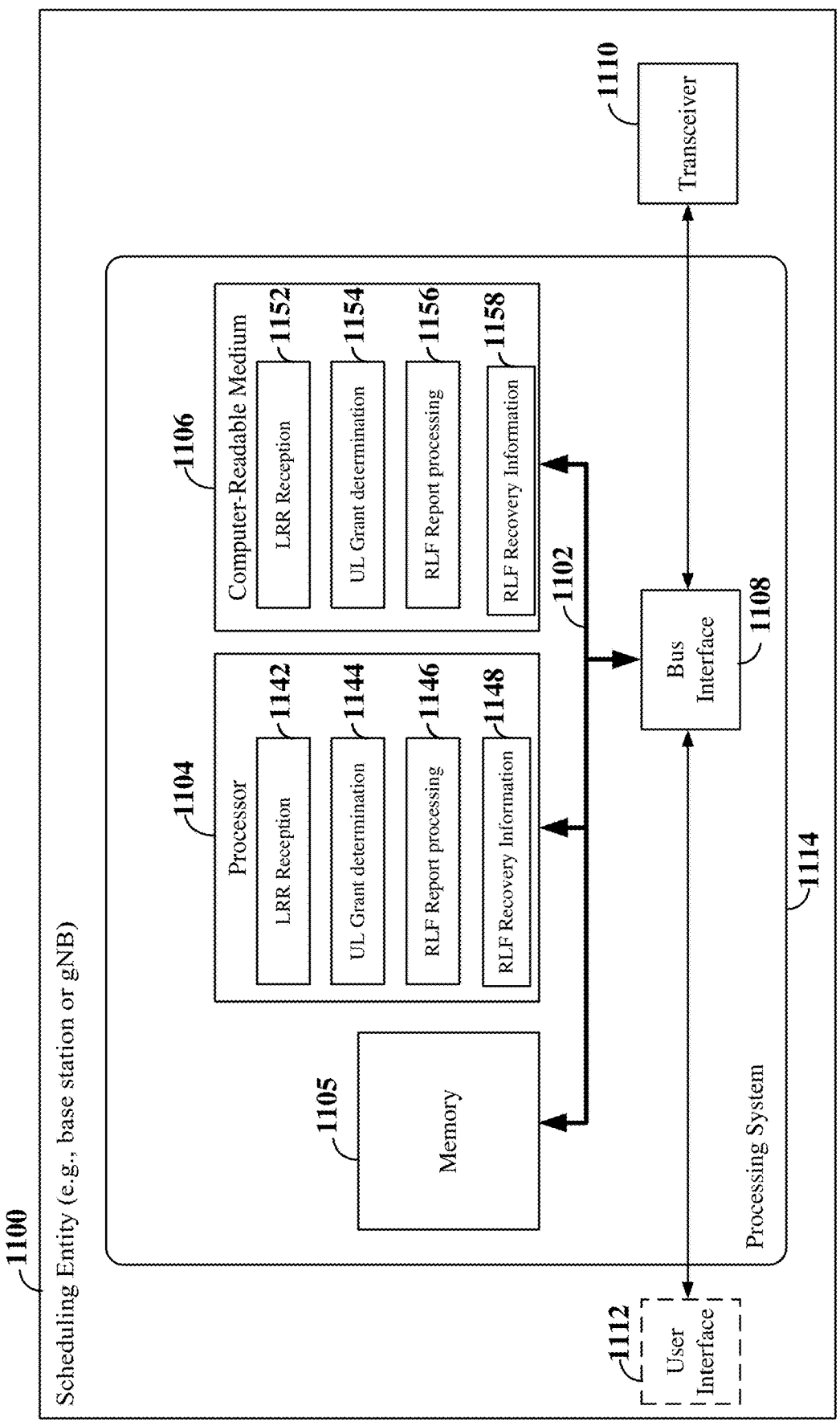
FIG. 11 is a block diagram illustrating an example of a hardware implementation for a scheduling entity employing a processing system according to some aspects.

FIG. 11 is a conceptual diagram illustrating an example of a hardware implementation for an exemplary scheduling entity 1100 employing a processing system 1114. For example, the scheduling entity 1100 may be a base station (e.g., gNB) or other scheduling entity as illustrated in any one or more of FIGS. 1, 2, and 5-7.

The scheduling entity 1100 may be implemented with the processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes described herein. The processor 1104 may in some instances be implemented via a baseband or modem chip and in other implementations, the processor 1104 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium (e.g., air interface). An optional user interface 1112 (e.g., keypad, display, touchscreen, speaker, microphone, control knobs, etc.) may also be provided, but may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. In some examples, the computer-readable medium 1106 may be part of the memory 1105. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. In particular, the processor 1104 may include LLR reception circuitry 1142, configured to receive and recognize the LRR as either an indication of RLF, a request for recovery of the failed link, or both. Additionally, the LLR reception circuitry 1142 is configured to recognize a single bit LRR as indicating one or both of an indication and/or recovery request. The LLR reception circuitry 1142 may further be configured to execute LLR reception software 1152 stored in the computer-readable medium 1106 to implement one or more of the functions described herein.

The processor 1104 may further include UL grant determination circuitry 1144 configured to generate the UL grant and send the UL grant to the UE via transceiver 1110. In some examples, the UL grant determination circuitry 1144 may include one or more hardware components that provide the physical structure that performs processes related to wireless communication (e.g., UL grant signal transmission) and signal processing (e.g., receiving a processed received signal (e.g., LRR from LRR reception circuitry 1142) and/or processing a signal for transmission (e.g., the UL grant)). The UL grant determination circuitry 1144 may further be configured to execute UL grant determination software 1154 stored in the computer-readable medium 1106 to implement one or more of the functions described herein.

According to further aspects, the processor 1104 may include RLF report reception and processing circuitry 1146 that is configured to receive the RLF report from the UE, and process the information contained therein. In particular, the RLF report reception and processing circuitry 1146 is configured to receive the RLF report received in the MAC-CE on the PUSCH channel from the UE. The various information therein may be received and processed for, in turn, determining RLF recovery information that is to be sent to the UE. The RLF report reception and processing circuitry 1146 may further be configured to execute RLF report processing software 1156 stored in the computer-readable medium 1106 to implement one or more of the functions described herein.

In yet further aspects, the processor 1104 may include RLF recovery information generation circuitry 1148 that is configured to determine RLF recovery information based on the report processed by the RLF report reception and processing circuitry 1146. According to some examples, the RLF recovery information generation circuitry 1148 may signal a beam change, a TCI state change, or change of the serving cell to the UE as described before. The RLF recovery information generation circuitry 1148 may further be configured to execute RLF recovery information generation software 1158 stored in the computer-readable medium 1106 to implement one or more of the functions described herein.

Figure 12:
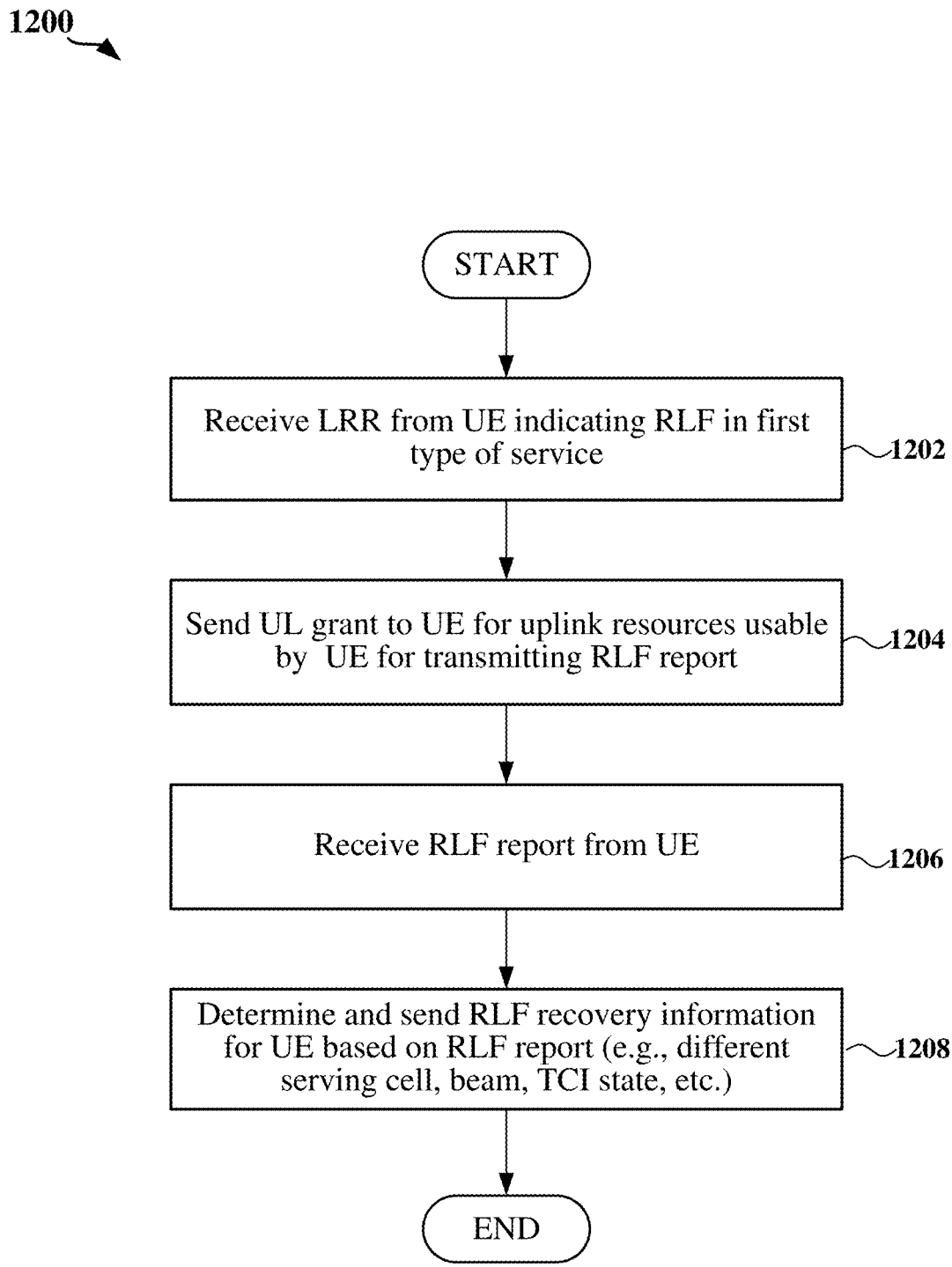
FIG. 12 is a flow chart of another exemplary method for radio link monitoring and link recovery request signaling at a scheduling entity according to some aspects.

FIG. 12 is a flow chart of another method 1200 for RLM monitoring and RLF determination according to some aspects. As described below, some or all illustrated features may be omitted in a particular implementation within the scope of the present disclosure, and some illustrated features may not be required for implementation of all embodiments. In some examples, the method 1200 may be performed by any of the base stations illustrated in FIG. 1, 2, 5-7 or 11, by a processor or processing system, or by any suitable means for carrying out the described functions.

Method 1200 includes receiving a link recovery request (LRR) from a user equipment (UE) or scheduled entity in a reserved resource on a first uplink channel as shown in block 1202. The LRR indicates a radio link failure of a first link of a first type of service having a higher reliability specification and a lower latency specification (e.g., URLLC) than a second type of service that are both capable of being provided in the communication network (e.g., eMBB). It is noted that the LRR may be configured as a single bit within the reserved resource. Furthermore, the reserved resource may be a periodically scheduled resource such as was illustrated by 402 in FIG. 4. Additionally, the first uplink channel may be a PDCCH that is operable with the second type of service (e.g., eMBB) as the first link for the first type of service has been determined as having failed.

In an aspect, the LRR reception circuitry 1142 in FIG. 11 as one example (and/or software 1152), or equivalents thereof may implement means for receiving a link recovery request (LRR) from a user equipment (UE) in a reserved resource on a first uplink channel where the LRR indicates a radio link failure of a first link of a first type of service having a higher reliability specification and a lower latency specification than a second type of service that are both capable of being provided in the communication network. The means for receiving a link recovery request (LRR) may also include transceiver 1110 according to some aspects.

Additionally, method 1200 includes sending a grant of uplink (UL) resources to the UE in response to the received LRR, where the resources are usable by the UE for transmitting an RLF report as shown in block 1204. The grant for UL resources indicates an allocation of resources on a second uplink channel that is configured for transmission of an RLF report, where the second uplink channel may be the PUSCH. The UL grant may be communicated to the UE using a downlink channel such as PDCCH or PDSCH, but is not limited to such. For example, the grant may be conveyed by DCI within a PDCCH. In an aspect, the UL grant determination circuitry 1144 and/or software 1154, or equivalents thereof, may implement means for sending the grant of UL resources to the UE in response to the received LRR, where the resources are usable by the UE for transmitting an RLF report. The means for sending the grant for UL resources may also include transceiver 1110 according to some aspects.

Further, method 1200 includes receiving the RLF report from the UE over the second uplink channel (and more particularly in the allocated resource of the second uplink channel as conveyed by the UL grant) as shown at block 1206. As discussed above, the RLF report may be configured as a MAC-CE on the PUSCH, but is not limited to such. The RLF report may contain various information including, but not limited to, one or more of link quality measurements of the first link sent by the base station, channel measurements of one or more other serving cells that are potential candidate cells for recovery of the first type of service, a suggested beam of the serving cell for recovery of the first type of service, a suggested transmission configuration indicator (TCI) state, or channel measurements of one or more other serving cells that are potential candidate cells for recovery of the first type of service include measurement of reference signal receive power (RSRP), all of which may be utilized by the base station for determining recovery information for the UE to be able to recover the first type of service (e.g., URLLC).

In an aspect, RLF report processing circuitry 1146 and/or software 1156, or equivalents thereof may implement a means for receiving and/or processing the RLF report from the UE over the second uplink channel. The means for receiving and/or processing the RLF report from the UE over the second uplink channel may also include transceiver 1110 according to some aspects.

Method 1200 may further include determining and sending RLF recovery information for the UE based on the RLF report as shown in block 1208. As discussed earlier, the RLF recovery information may include configuring the UE to communicate with another serving cell, transmit/receive using another beam, or switch to another TCI state as just a few examples of how the UE may recover communication using the first type of service (e.g., URLLC). In an aspect, RLF recovery information generation circuitry 1148 and/or software 1158, or equivalents thereof may implement a means for determining and sending RLF recovery information for the UE based on the RLF report. The means for determining and sending RLF recovery information for the UE based on the RLF report may also include transceiver 1110 according to some aspects.

In other aspects, method 1200 may include the base station configured to send RRC signaling to the UE for configuring operation of the UE for determining and reporting RLF. This RRC signaling may occur prior to the various operations illustrated in FIGS. 5-7, for example, wherein the UE is configured by the UE to perform the various RLM and RLF determinations and reporting. Additionally, RRC signaling may occur after receiving the RLF report, such as concomitant with the RLF recovery configuration information, for example.

According to yet other aspects, method 1200 may include the LRR configured as a scheduling request (SR), and further that the SR is transmitted on a physical uplink control channel (PUCCH) resource. In still further aspects of method 1200, the RLF report may be configured as a MAC-CE that indicates for each of the plurality of serving cells whether or not a radio link failure is detected for the first type of service from each respective cell of the plurality of cells. Additionally, the RLF report may further indicate radio link failure in the RLF report for serving cells in the plurality of serving cells that are configured with the first type of service for the UE. Additionally, the RLF report may further indicate that serving cells in the plurality of serving cells that are not configured with the first type of service for the UE are potential serving cells for the first type of service.

Figure 13:
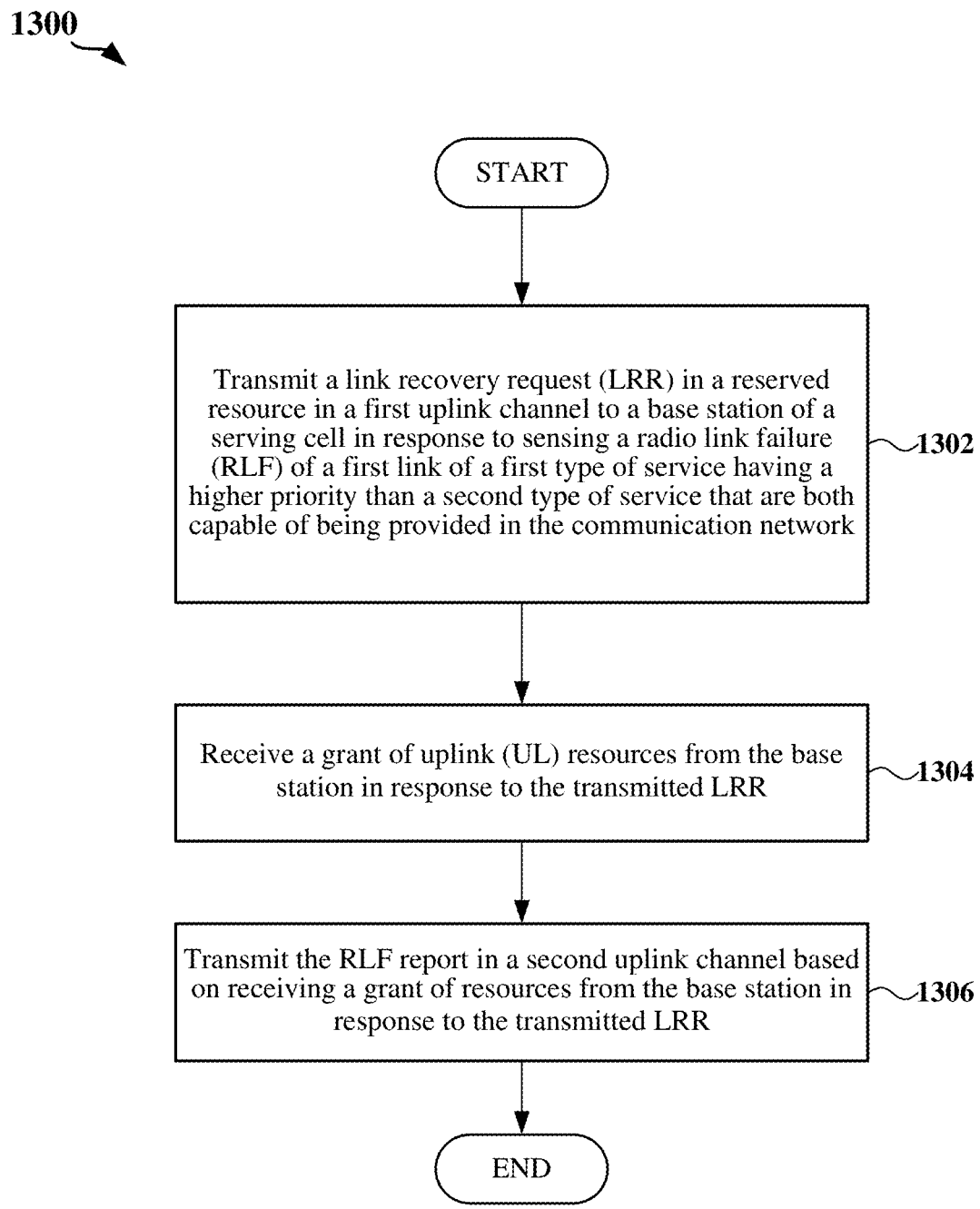
FIG. 13 is a flow chart of yet another exemplary method for radio link monitoring and link recovery request signaling at a UE according to some aspects.

FIG. 13 illustrates a flow chart of another example method 1300 for radio link monitoring and link recovery request signaling at a UE according to some aspects. In some examples, the method 1300 may be performed by scheduled entities or UEs such as illustrated in FIG. 1, 2, or 7, by scheduled entity 800 described above in connection with FIG. 8, by a processor or processing system, or by any suitable means for carrying out the described functions.

At block 1302, method 1300 includes transmitting a link recovery request (LRR) in a reserved resource in a first uplink channel to a base station of a serving cell in response to sensing a radio link failure (RLF) of a first link of a first type of service having a higher priority than a second type of service that are both capable of being provided in the communication network. In some aspects, it is noted that the first type of service with higher priority is a service having a higher reliability specification and a lower latency specification than the second type of service. For example, the first type of service is URLLC service and the second type of service is eMBB service. In an aspect, the RLM circuitry 842, the RLF determination/sensing circuitry 844, the LRR generation circuitry 846, and, transceiver 810, and/or software 852, 854, and 856 shown and described above in connection with FIG. 8 or equivalents thereof, may provide means for transmitting the LRR in the reserved resource in the first uplink channel responsive to sensing the RLF of the first link.

Further, at block 1304, method 1300 includes receiving a grant of uplink (UL) resources from the base station in response to the transmitted LRR. In an aspect, the transceiver 810 shown and described above in connection with FIG. 8 or equivalents thereof, may provide means for receiving the grant of UL resources from the base station in response to the transmitted LRR.

Moreover, as shown in block 1306, method 1300 includes transmitting the RLF report in a second uplink channel based on the receiving the grant of UL resources from the base station. In an aspect, the RLF generation and/or transmit circuitry 848, and/or software 858, as well as transceiver 810 shown and described above in connection with FIG. 8 or equivalents thereof, may provide means for transmitting the RLF report in the second uplink channel based on the receiving the grant of UL resources from the base station.

Figure 14:
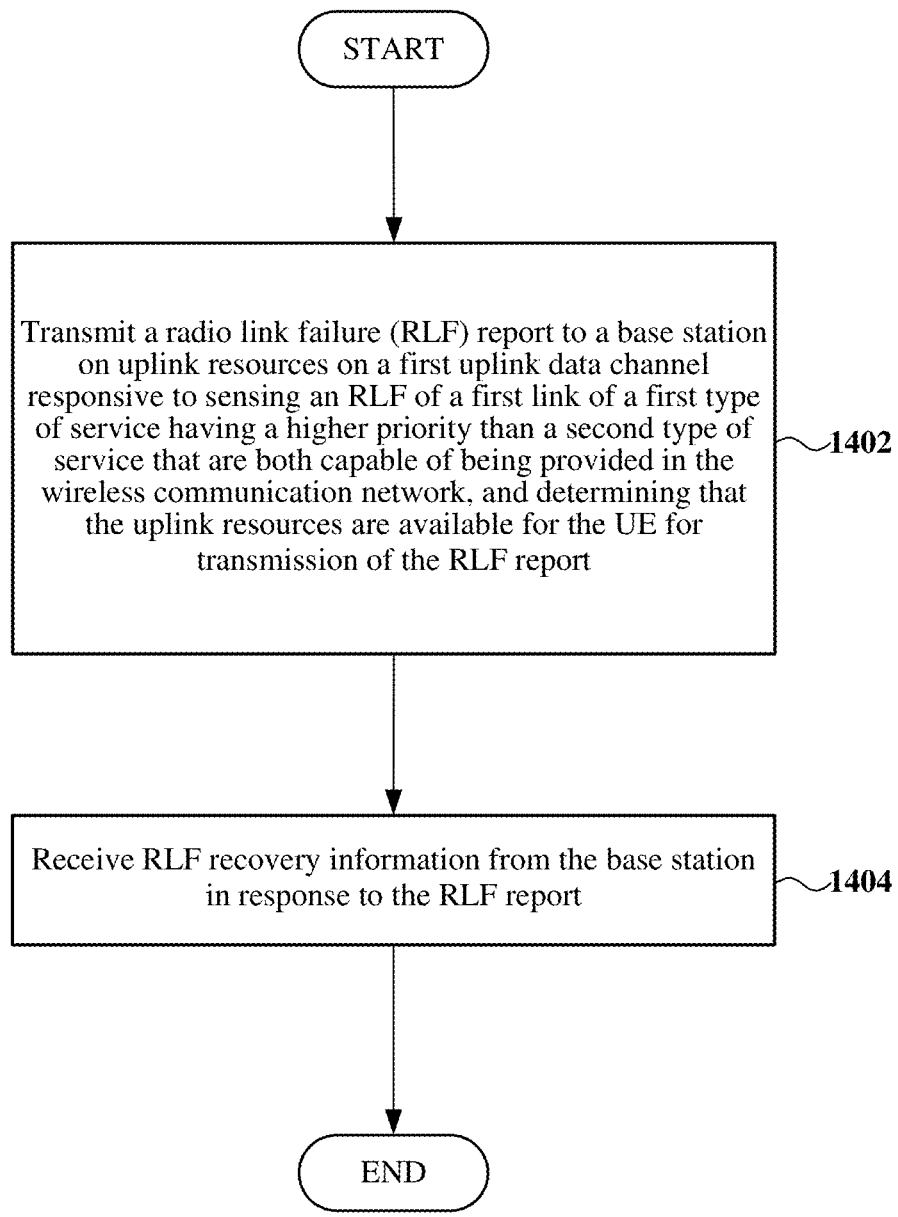
FIG. 14 is a flow chart of still yet another exemplary method for radio link monitoring and signaling at a UE according to some aspects.

FIG. 14 is a flow chart of still yet another exemplary method 1400 for radio link monitoring and signaling at a UE according to some aspects. In some examples, the method 1400 may be performed by scheduled entities or UEs such as illustrated in FIG. 1, 2, or 7, by scheduled entity 800 described above in connection with FIG. 8, by a processor or processing system, or by any suitable means for carrying out the described functions.

At block 1402, method 1400 includes transmitting a radio link failure (RLF) report to a base station on uplink resources on a first uplink data channel responsive to sensing an RLF of a first link of a first type of service having a higher priority than a second type of service that are both capable of being provided in the wireless communication network, and determining that the uplink resources are available for the UE for transmission of the RLF report. In some aspects, it is noted that the first type of service with higher priority is a service having a higher reliability specification and a lower latency specification than the second type of service. For example, the first type of service is URLLC service and the second type of service is eMBB service. In an aspect, the RLF generation and/or transmit circuitry 848, and/or software 858, as well as transceiver 810 shown and described above in connection with FIG. 8 or equivalents thereof, may provide means for transmitting the RLF report on UL resources based on the first uplink data channel.

At block 1404, method 1400 includes receiving RLF recovery information from the base station in response to the RLF report. In an aspect, transceiver 810 shown and described above in connection with FIG. 8 or equivalents thereof, may provide means for receiving RLF recovery information from the base station in response to the RLF report.

Several aspects of a wireless communication network have been presented with reference to an exemplary implementation. As those skilled in the art will readily appreciate, various aspects described throughout this disclosure may be extended to other telecommunication systems, network architectures and communication standards.

The following provides an overview of aspects of the present disclosure:

Aspect 1: A method for wireless communication at a user equipment (UE) in a communications network, the method comprising transmitting a link recovery request (LRR) in a reserved resource in a first uplink channel to a base station of a serving cell in response to sensing a radio link failure (RLF) of a first link of a first type of service having a higher priority than a second type of service that are both capable of being provided in the communication network, receiving a grant of uplink (UL) resources from the base station in response to the transmitted LRR, and transmitting the RLF report in a second uplink channel based on the receiving the grant of UL resources from the base station.

Aspect 2: The method of aspect 1, further comprising transmitting the RLF report using a media access control (MAC) control element (MAC-CE) on the second uplink channel.

Aspect 3: The method of aspect 1 or aspect 2, wherein the UE is configured for radio link monitoring (RLM) including RLF determination with RRC signaling from the base station of the serving cell.

Aspect 4: The method of any of aspects 1 through 3, wherein the sensing of the RLF further comprises monitoring one or more reference signals on the first link, and determining a link quality measurement based on the monitoring of the one or more reference signals.

Aspect 5: The method of aspect 4, wherein the one or more reference signals comprises a synchronization signal block (SSB) or a channel state information reference signal (CSI-RS).

Aspect 6: The method of any of aspects 1 through 6, wherein the sensing of the RLF further comprises determining link quality measurement by calculating a hypothetical block error rate (BLER) for a physical downlink control channel (PDCCH) of the first link based on the monitored one or more reference signals, and comparing the hypothetical BLER to a target BLER to determine that the first radio link has failed.

Aspect 7: The method of any of aspects 1 through 6, wherein the RLF report comprises one or more of link quality measurements of the first link from the serving cell, channel measurements of one or more other serving cells that are potential candidate cells for recovery of the first type of service, a suggested beam of the serving cell for recovery of the first type of service, or a suggested transmission configuration indicator (TCI) state for recovery of the first type of service.

Aspect 8: The method of any of aspects 1 through 7, further comprising measuring a reference signal received power (RSRP) of the first link, comparing the measured RSRP with a predetermined threshold, and sensing the RLF when the RSRP is below the predetermined threshold.

Aspect 9: The method of aspect 8, further comprising determining the RLF when one of at least one beam or a transmission configuration indicator (TCI) state of the serving cell does not support the first type of service based on the measured RSRP being below the predetermined threshold.

Aspect 10: The method of any of aspects 1 through 9, wherein the LRR is configured as a scheduling request (SR) on a physical uplink control channel (PUCCH) resource.

Aspect 11: The method of any of aspects 1 through 10, further comprising monitoring a plurality of serving cells, and configuring the RLF report as a MAC-CE that indicates for each of the plurality of serving cells whether or not a radio link failure is detected for the first type of service from each respective cell of the plurality of cells.

Aspect 12: The method of aspect 11, further comprising indicating additional radio link failure in the RLF report for serving cells in the plurality of serving cells that are configured with the first type of service for the UE.

Aspect 13: The method of aspect 11, further comprising indicating in the RLF report that serving cells in the plurality of serving cells that are not configured with the first type of service for the UE are potential serving cells for the first type of service.

Aspect 14: The method of any of aspects 1 through 13, wherein the LLR comprises at least one of an indication that the RLF for the first link has been determined by the UE, or a request to the base station for recovery of the first link of the first type of service.

Aspect 15: The method of any of aspects 1 through 14, wherein the LRR comprises one bit of information that indicates the determination of the RLF for the first link or the request for recovery of the first link.

Aspect 16: The method of any of aspects 1 through 15, wherein the first type of service is an ultra-reliable, low-latency (URLLC) service and the second type of service is an enhanced mobile broadband (eMBB) service.

Aspect 17: The method of any of aspects 1 through 16, wherein the UE is configured to utilize the second type of service for the first uplink channel and the second uplink channel when the RLF of the first link is determined.

Aspect 18: The method of any of aspects 1 through 17, wherein the first uplink channel and the second uplink channel utilize the first type of service on at least one other serving cell when the RLF of the first link is determined.

Aspect 19: A user equipment (UE) in a wireless communication network, comprising: a wireless transceiver; a memory; and a processor communicatively coupled to the wireless transceiver and the memory, wherein the processor and the memory are configured to: transmit a link recovery request (LRR) in a reserved resource in a first uplink channel to a base station of a serving cell in response to sensing a radio link failure (RLF) of a first link of a first type of service having a higher priority than a second type of service that are both capable of being provided in the communication network, receive a grant of uplink (UL) resources from the base station in response to the transmitted LRR, and transmit the RLF report in a second uplink channel based on the receiving the grant of UL resources from the base station.

Aspect 20: The UE of aspect 19, wherein the processor and the memory are configured to transmit the RLF report using a media access control (MAC) control element (MAC-CE) on the second uplink channel.

Aspect 21: The UE of aspect 19 or aspect 20, wherein the processor and the memory are further configured to determine the RLF through determining a link quality measurement including: calculating a hypothetical block error rate (BLER) for a physical downlink control channel (PDCCH) of the first link based on the monitored one or more reference signals, and comparing the hypothetical BLER to a target BLER to determine that the first radio link has failed.

Aspect 22: The UE of any of aspects 19 through 21, wherein the RLF report comprises one or more of link quality measurements of the first link from the serving cell, channel measurements of one or more other serving cells that are potential candidate cells for recovery of the first type of service, a suggested beam of the serving cell for recovery of the first type of service, or a suggested transmission configuration indicator (TCI) state for recovery of the first type of service.

Aspect 23: The UE of any of aspects 19 through 22, wherein the processor and the memory are configured to configure the LRR as a scheduling request (SR) on a physical uplink control channel (PUCCH) resource.

Aspect 24: A method for wireless communication at a user equipment (UE) in a wireless communication network, the method comprising: transmitting a radio link failure (RLF) report to a base station on uplink resources on a first uplink data channel responsive to sensing an RLF of a first link of a first type of service having a higher priority than a second type of service that are both capable of being provided in the wireless communication network, and determining that the uplink resources are available for the UE for transmission of the RLF report, and receiving RLF recovery information from the base station in response to the RLF report.

Aspect 25: The method of aspect 24, wherein the determining that the uplink resources are available for the UE to transmit the RLF report on the uplink data channel further comprises determining whether the uplink data channel has available resources to carry a MAC-CE for transmitting the RLF report Aspect 26: The method of aspect 24 or aspect 25, wherein the uplink data channel comprises a physical uplink shared data channel (PUSCH).

Aspect 27: The method of aspect 26, further comprising: transmitting the RLF report on the PUSCH using the second type of service when the RLF has been sensed for the first type of service.

Aspect 28: A method for wireless communication at a base station in a wireless communication network, the method comprising: receiving a link recovery request (LRR) from a user equipment (UE) in a reserved resource on a first uplink channel, wherein the LRR indicates a radio link failure of a first link of a first type of service having a higher priority than a second type of service that are both capable of being provided in the communication network, sending a grant of uplink (UL) resources to the UE in response to the received LRR, wherein the grant for UL resources indicates an allocation of resources on a second uplink channel that is configured for transmission of an RLF report, and receiving the RLF report from the UE over the second uplink channel.

Aspect 29: The method of aspect 28, further comprising determining RLF recovery information for the UE for the first type of service based on the received RLF report, and sending the RLF recovery information to the UE.

Aspect 30: The method of aspect 28 or aspect 29, wherein the sending the grant of UL resources to the UE is sent on a physical downlink control channel (PDCCH).

Aspect 31: A base station, gNB, or network entity configured for wireless communication comprising a processor, and a memory coupled to the processor, the processor and memory configured to perform the method of any one of aspects 28 through 30.

Aspect 32: An apparatus configured for wireless communication comprising at least one means for performing a method of any one of aspects 1 through 18, aspects 24 through 27, or aspects 28 through 30.

Aspect 33: A non-transitory computer-readable medium storing computer-executable code, comprising code for causing an apparatus to perform a method of any one of aspects 1 through 18, aspects 24 through 27, or aspects 28 through 30.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5-8, and 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE) in a wireless communication network, the method comprising:
    transmitting a link recovery request (LRR) in a reserved resource in a first uplink channel to a base station of a serving cell in response to sensing a radio link failure (RLF) of a first link of a first type of service having a higher priority than a second type of service that are both capable of being provided in the serving cell, wherein the first uplink channel utilizes the second type of service on the serving cell;
    receiving a grant of uplink (UL) resources from the base station in response to the transmitted LRR; and transmitting an RLF report in a second uplink channel utilizing the second type of service on the serving cell based on the receiving the grant of UL resources from the base station.

2. The method of claim 1, further comprising:
transmitting the RLF report using a media access control (MAC) control element (MAC-CE) on the second uplink channel.

3. The method of claim 1, wherein the UE is configured for radio link monitoring (RLM) including RLF determination with RRC signaling from the base station of the serving cell.

4. The method of claim 1, wherein the sensing of the RLF further comprises:
monitoring one or more reference signals on the first link; and
determining a link quality measurement based on the monitoring of the one or more reference signals.

5. The method of claim 4, wherein the one or more reference signals comprises a synchronization signal block (SSB) or a channel state information reference signal (CSI-RS).

6. The method of claim 4, wherein the sensing of the RLF further comprises:
determining the link quality measurement by:
calculating a hypothetical block error rate (BLER) for a physical downlink control channel (PDCCH) of the first link based on the monitored one or more reference signals; and
comparing the hypothetical BLER to a target BLER to determine that the first link has failed.

7. The method of claim 1, wherein the RLF report comprises one or more of link quality measurements of the first link from the serving cell, channel measurements of one or more other serving cells that are potential candidate cells for recovery of the first type of service, a suggested beam of the serving cell for recovery of the first type of service, or a suggested transmission configuration indicator (TCI) state for recovery of the first type of service.

8. The method of claim 1, further comprising:
measuring a reference signal received power (RSRP) of the first link;
comparing the measured RSRP with a predetermined threshold; and
sensing the RLF when the RSRP is below the predetermined threshold.

9. The method of claim 8, further comprising:
determining the RLF when one of at least one beam or a transmission configuration indicator (TCI) state of the serving cell does not support the first type of service based on the measured RSRP being below the predetermined threshold.

10. The method of claim 1, wherein the LRR is configured as a scheduling request (SR) on a physical uplink control channel (PUCCH) resource.

11. The method of claim 1, further comprising:
monitoring a plurality of serving cells; and
configuring the RLF report as a MAC-CE that indicates whether or not radio link failure is detected for the first type of service from each respective cell of the plurality of cells.

12. The method of claim 11, further comprising:
indicating additional radio link failure in the RLF report for serving cells in the plurality of serving cells that are configured with the first type of service for the UE.

13. The method of claim 11, further comprising:
indicating in the RLF report that serving cells in the plurality of serving cells that are not configured with the first type of service for the UE are potential serving cells for the first type of service.

14. The method of claim 1, wherein the LLR comprises at least one of:
an indication that the RLF for the first link has been determined by the UE; or
a request to the base station for recovery of the first link of the first type of service.

15. The method of claim 14, wherein the LRR comprises one bit of information that indicates the determination of the RLF for the first link or the request for recovery of the first link.

16. The method of claim 1, wherein the first type of service is an ultra-reliable, low-latency communication (URLLC) service and the second type of service is an enhanced mobile broadband (eMBB) service.

17. A user equipment (UE) in a wireless communication network, comprising:
a wireless transceiver;
a memory; and
a processor communicatively coupled to the wireless transceiver and the memory, wherein the processor and the memory are configured to:
transmit a link recovery request (LRR) in a reserved resource in a first uplink channel to a base station of a serving cell in response to sensing a radio link failure (RLF) of a first link of a first type of service having a higher priority than a second type of service that are both capable of being provided in the serving cell, wherein the first uplink channel utilizes the second type of service on the serving cell;
receive a grant of uplink (UL) resources from the base station in response to the transmitted LRR; and
transmit an RLF report in a second uplink channel utilizing the second type of service on the serving cell based on the receiving the grant of UL resources from the base station.

18. The UE of claim 17, wherein the processor and the memory are configured to transmit the RLF report using a media access control (MAC) control element (MAC-CE) on the second uplink channel.

19. The UE of claim 17, wherein the processor and the memory are further configured to determine the RLF through determining a link quality measurement including:
monitoring one or more reference signals on the first link;
calculating a hypothetical block error rate (BLER) for a physical downlink control channel (PDCCH) of the first link based on the monitoring; and
comparing the hypothetical BLER to a target BLER to determine that the first radio link has failed.

20. The UE of claim 17, wherein the RLF report comprises one or more of link quality measurements of the first link from the serving cell, channel measurements of one or more other serving cells that are potential candidate cells for recovery of the first type of service, a suggested beam of the serving cell for recovery of the first type of service, or a suggested transmission configuration indicator (TCI) state for recovery of the first type of service.

21. The UE of claim 17, wherein the processor and the memory are configured to configure the LRR as a scheduling request (SR) on a physical uplink control channel (PUCCH) resource.

* * * * *